United States Patent
Breutzman et al.

(10) Patent No.: US 11,512,446 B2
(45) Date of Patent: Nov. 29, 2022

(54) MAGNETORHEOLOGICAL FLUID JOYSTICK SYSTEMS PROVIDING DETENT-TRIGGERED WORK VEHICLE FUNCTIONS

(71) Applicant: Deere & Company, Moline, IL (US)

(72) Inventors: Mark E. Breutzman, Potosi, WI (US); Amy K. Jones, Asbury, IA (US); Madeline T. Oglesby, Asbury, IA (US); Erik W. McWethy, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 280 days.

(21) Appl. No.: 16/922,321

(22) Filed: Jul. 7, 2020

(65) Prior Publication Data

US 2021/0341033 A1   Nov. 4, 2021

Related U.S. Application Data

(60) Provisional application No. 63/019,083, filed on May 1, 2020.

(51) Int. Cl.
*E02F 9/20* (2006.01)
*G05G 5/03* (2008.04)
(Continued)

(52) U.S. Cl.
CPC .......... *E02F 9/2004* (2013.01); *E02F 9/2012* (2013.01); *E02F 9/2029* (2013.01);
(Continued)

(58) Field of Classification Search
CPC ................ E02F 9/2012; G05G 1/015; G05G 2009/04751; G05G 2505/00
See application file for complete search history.

(56) References Cited

U.S. PATENT DOCUMENTS 7,197,873 B1   4/2007   Windhorst et al.
8,066,567 B2   11/2011  Waggoner et al.
(Continued)

FOREIGN PATENT DOCUMENTS

CA    1203605 A  *  4/1986  ............. E02F 3/438
CN   102027268 B     12/2013
(Continued)

OTHER PUBLICATIONS

USPTO, Non-Final Office Action issued in Utility U.S. Appl. No. 17/002,052 dated Nov. 8, 2021.
(Continued)

*Primary Examiner* — Vicky A Johnson
(74) *Attorney, Agent, or Firm* — Klintworth & Rozenblat IP LLP

(57) ABSTRACT

Embodiments of a work vehicle magnetorheological fluid (MRF) joystick system includes a joystick device having a base housing, a joystick movably mounted to the base housing, and a joystick position sensor monitoring movement of the joystick relative to the base housing. An MRF joystick resistance mechanism is controllable to vary a joystick stiffness resisting movement of the joystick relative to the base housing in at least one degree of freedom. A controller architecture is coupled to the joystick position sensor and to the MRF joystick resistance mechanism. The controller architecture is configured to: (i) command the MRF joystick resistance mechanism to increase the joystick stiffness when the joystick is moved into a first predetermined detent position to generate a first MRF detent; and (ii) selectively activate a first detent-triggered function of the work vehicle based, at least in part, on joystick movement relative to the first MRF detent.

20 Claims, 7 Drawing Sheets

(51) Int. Cl.

| | |
|---|---|
| *G05G 9/047* | (2006.01) |
| *E02F 9/26* | (2006.01) |
| *G05G 5/12* | (2006.01) |
| *G05G 5/02* | (2006.01) |
| *F16F 9/53* | (2006.01) |
| *G06F 3/01* | (2006.01) |
| *E02F 9/24* | (2006.01) |
| *G05G 1/015* | (2008.04) |
| *G05G 1/04* | (2006.01) |
| *F15B 13/01* | (2006.01) |
| *G05G 5/05* | (2006.01) |
| *E02F 3/32* | (2006.01) |
| *E02F 3/76* | (2006.01) |

(52) U.S. Cl.
CPC .............. *E02F 9/24* (2013.01); *E02F 9/265* (2013.01); *F15B 13/01* (2013.01); *F16F 9/535* (2013.01); *G05G 1/015* (2013.01); *G05G 1/04* (2013.01); *G05G 5/02* (2013.01); *G05G 5/03* (2013.01); *G05G 5/05* (2013.01); *G05G 5/12* (2013.01); *G05G 9/047* (2013.01); *G06F 3/016* (2013.01); *E02F 3/32* (2013.01); *E02F 3/7609* (2013.01); *E02F 3/7636* (2013.01); *E02F 9/261* (2013.01); *G05G 2009/04751* (2013.01); *G05G 2009/04766* (2013.01); *G05G 2505/00* (2013.01)

(56) References Cited

U.S. PATENT DOCUMENTS

| | | | |
|---|---|---|---|
| 8,639,393 B2 | 1/2014 | Taylor et al. | |
| 8,972,125 B1 | 3/2015 | Elliott | |
| 9,141,126 B2 | 9/2015 | Hynes et al. | |
| 9,181,676 B2 | 11/2015 | Meislahn et al. | |
| 9,341,258 B1 | 5/2016 | Templin | |
| 9,771,705 B2 | 9/2017 | Horstman et al. | |
| 9,777,460 B2 | 10/2017 | Wuisan et al. | |
| 9,777,461 B2 | 10/2017 | Wuisan et al. | |
| 9,797,114 B2 | 10/2017 | Maifield et al. | |
| 10,061,343 B2 | 8/2018 | Fredrickson et al. | |
| 10,066,367 B1 | 9/2018 | Wang et al. | |
| 10,119,244 B2 | 11/2018 | Elkins | |
| 10,145,084 B2 | 12/2018 | Fredrickson | |
| 11,048,330 B2 | 6/2021 | Eck et al. | |
| 11,086,350 B2 | 8/2021 | Wakuda et al. | |
| 2001/0052893 A1 | 12/2001 | Jolly et al. | |
| 2003/0098196 A1 | 5/2003 | Yanaka | |
| 2004/0204811 A1* | 10/2004 | Huang | G05G 5/03 |
| | | | 701/50 |
| 2004/0221674 A1 | 11/2004 | Komelson | |
| 2006/0197741 A1 | 9/2006 | Biggadike | |
| 2011/0005344 A1 | 1/2011 | Haevescher | |
| 2013/0229272 A1* | 9/2013 | Elliott | G05G 9/047 |
| | | | 74/471 XY |
| 2016/0179128 A1 | 6/2016 | Guglielmo | |
| 2017/0073935 A1* | 3/2017 | Friend | E02F 9/265 |
| 2018/0058039 A1 | 3/2018 | Fredrickson et al. | |
| 2019/0071119 A1 | 3/2019 | Takenaka et al. | |
| 2019/0210854 A1 | 7/2019 | Eck et al. | |
| 2019/0286237 A1 | 9/2019 | Eck et al. | |
| 2020/0041331 A1 | 2/2020 | Hoshino et al. | |
| 2020/0125132 A1 | 4/2020 | Wakuda et al. | |
| 2021/0286431 A1 | 9/2021 | Eck et al. | |
| 2021/0340723 A1 | 11/2021 | Velde et al. | |
| 2021/0340724 A1 | 11/2021 | Kenkel et al. | |
| 2021/0340725 A1 | 11/2021 | Velde et al. | |
| 2021/0340728 A1 | 11/2021 | Graham et al. | |
| 2021/0341032 A1 | 11/2021 | Velde et al. | |
| 2021/0341033 A1 | 11/2021 | Breutzman et al. | |
| 2021/0341960 A1 | 11/2021 | Kenkel et al. | |

FOREIGN PATENT DOCUMENTS

| | | | |
|---|---|---|---|
| CN | 112267516 A | 1/2021 | |
| DE | 19848191 A1 | 4/2000 | |
| DE | 102004017148 A1 | 1/2005 | |
| DE | 102004041690 A1 | 3/2005 | |
| DE | 112009003181 T5 | 1/2012 | |
| DE | 102012203095 A1 * | 9/2013 | ............... F16F 9/53 |
| DE | 112013001281 T5 | 7/2019 | |
| DE | 102020104810 A1 | 2/2021 | |
| JP | 2014174726 A | 9/2014 | |
| KR | 20190074555 A | 6/2019 | |
| WO | 9642078 A1 | 12/1996 | |
| WO | 2015009161 A1 | 1/2015 | |

OTHER PUBLICATIONS

Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008. (19 pages).

Deere & Company, John Deere Motor Grader Left Dual Joystick Controls Tutorial, https://www.youtube.com/watch?v=iYxPlxzD8g4 &feature=youtu.be&t=25, Mar. 7, 2017. (2 pages).

MRF Damper, FMR-70S-403 Brochure, undated admitted prior art. (3 pages).

Non-Final Office Action issued in Utility U.S. Appl. No. 16/864,696 dated Sep. 16, 2021.

German Search Report issued in application No. DE102021203860.3 dated Jan. 28, 2022 with English translation (11 pages).

USPTO, Non-Final Office Action issued in Utility U.S. Appl. No. 16/916,800 dated Jun. 22, 2022.

German Search Report issued in application No. DE102021203807.7 dated Jan. 26, 2022 (05 pages).

USPTO, Non-Final Office Action issued in Utility U.S. Appl. No. 16/864,749 dated Sep. 8, 2022.

* cited by examiner

MAGNETORHEOLOGICAL FLUID JOYSTICK SYSTEMS PROVIDING DETENT-TRIGGERED WORK VEHICLE FUNCTIONS

CROSS-REFERENCE TO RELATED APPLICATION(S)

This application claims priority to U.S. provisional application Ser. No. 63/019,083, filed with the United States Patent and Trademark Office on May 1, 2020.

STATEMENT OF FEDERALLY SPONSORED RESEARCH OR DEVELOPMENT

Not applicable.

FIELD OF THE DISCLOSURE

This disclosure relates to magnetorheological fluid (MRF) joystick systems, which utilize MRF joystick resistance mechanisms to generate detents assisting in selectively triggering various work vehicle functions.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to an outer terminal end of the boom assembly. Common examples of work vehicles having such joystick-controlled boom assemblies include excavators, feller-bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may utilize with one or more joysticks to control blade movement and positioning. Joystick devices are also commonly utilized to steer or otherwise control the directional movement of the work vehicle chassis in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work vehicle MRF joystick system includes a joystick device having a base housing, a joystick movably mounted to the base housing, and a joystick position sensor monitoring movement of the joystick relative to the base housing. An MRF joystick resistance mechanism is controllable to vary a joystick stiffness resisting movement of the joystick relative to the base housing in at least one degree of freedom. A controller architecture is coupled to the joystick position sensor and to the MRF joystick resistance mechanism. The controller architecture is configured to: (i) command the MRF joystick resistance mechanism to increase the joystick stiffness when the joystick is moved into a first predetermined detent position to generate a first MRF detent; and (ii) selectively activate a first detent-triggered function of the work vehicle based, at least in part, on joystick movement relative to the first MRF detent.

In further embodiments, the work vehicle MRF joystick system includes a joystick device having a base housing, a joystick movably mounted to the base housing, and a joystick position sensor monitoring movement of the joystick relative to the base housing. An MRF joystick resistance mechanism is controllable to vary a joystick stiffness resisting movement of the joystick relative to the base housing in at least one degree of freedom. A controller architecture is coupled to the joystick position sensor and to the MRF joystick resistance mechanism. The controller architecture is configured to: (i) command the MRF joystick resistance mechanism to increase the joystick stiffness when the joystick is moved into a first predetermined detent position to generate a first MRF detent; and (ii) selectively activate an automated movement routine of the work vehicle based, at least in part, on joystick movement relative to the first MRF detent.

In still further embodiments, the work vehicle MRF joystick system includes a joystick device having a base housing, a joystick movably mounted to the base housing, and a joystick position sensor monitoring movement of the joystick relative to the base housing. An MRF joystick resistance mechanism is controllable to vary a joystick stiffness resisting movement of the joystick relative to the base housing in at least one degree of freedom. A controller architecture is coupled to the joystick position sensor and to the MRF joystick resistance mechanism. The controller architecture is configured to: (i) command the MRF joystick resistance mechanism to increase the joystick stiffness when the joystick is moved into a first predetermined detent position to generate a first MRF detent; and (ii) selectively place the work vehicle in an operator-selected control mode based on joystick movement relative to the first MRF detent.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
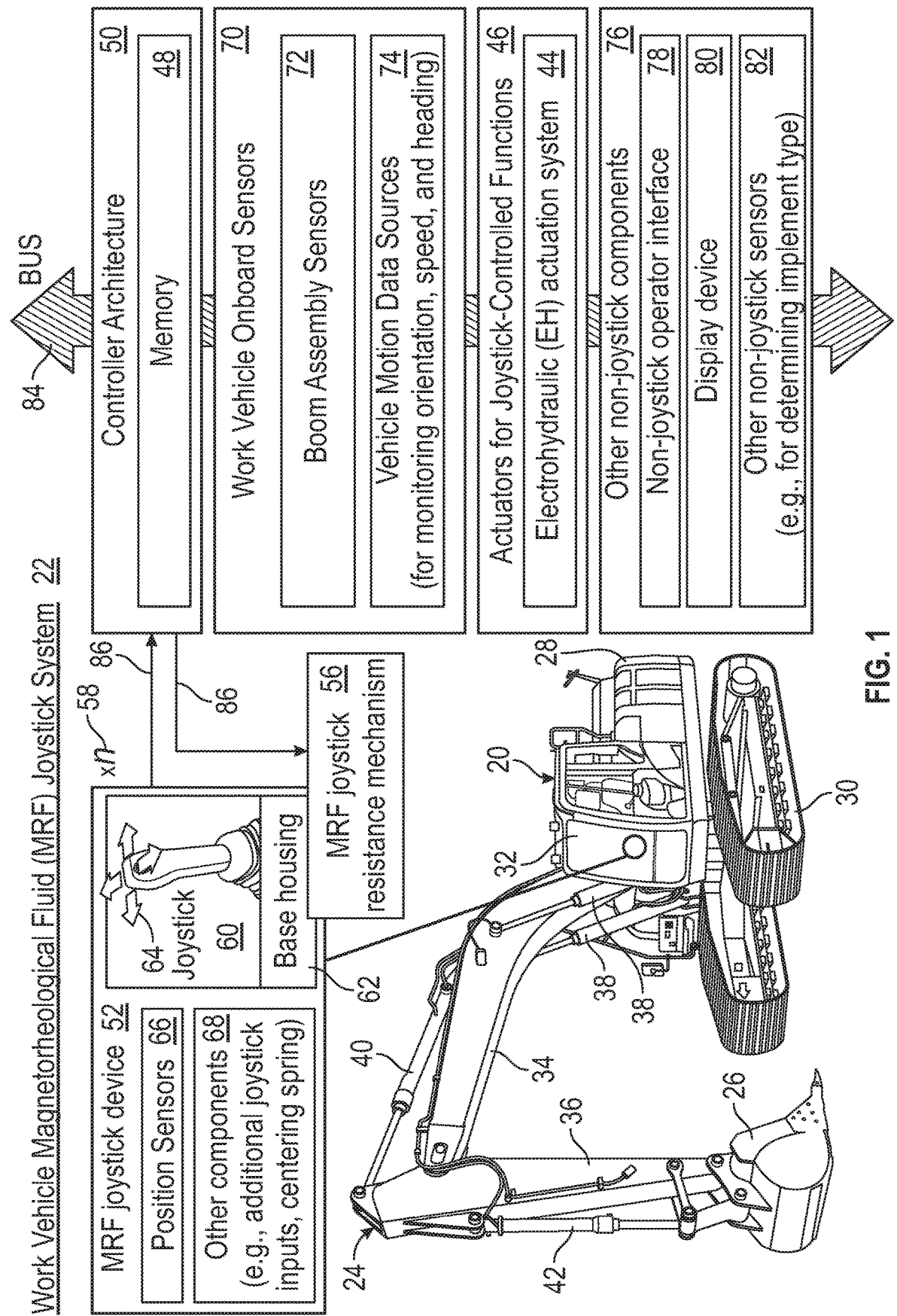
FIG. 1 is a schematic of an example magnetorheological fluid (MRF) joystick system onboard a work vehicle (here, an excavator) and enabling the selective activation of one or more detent-triggered work vehicle functions, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "work vehicle" includes all parts of a work vehicle or work machine. Thus, in implementations in which a boom assembly terminating in an implement is attached to the chassis of a work vehicle, the term "work vehicle" encompasses both the chassis and the boom assembly, as well as the implement or tool mounted to the terminal end of the boom assembly.

Overview

The following describes magnetorheological fluid (MRF) joystick systems configured to selectively generate MRF detents, which assist an operator in activating one or more work vehicle functions (herein, "detent-triggered work vehicle functions"). Embodiments of the MRF joystick system monitor movement of at least one joystick and selectively generate regions of increased resistance to joystick movement (an "MRF detent") when the joystick is moved into a predetermined position (a "detent position") within its range of motion (ROM). As the MRF detents are generated and removed, the MRF joystick system continues to monitor joystick movement; and, when an operator moves the joystick in a predefined manner relative to an MRF detent (possibly combined with other operator input actions), the MRF joystick system activates a corresponding detent-triggered work vehicle function. In essence, then, the MRF detents (and, specifically, the joystick positions corresponding to the MRF detents when generated) serve as reference points for establishing an operator intent to trigger or activate particular work vehicle functions as the operator manipulates a joystick having the below-described MRF capabilities. The work vehicle function triggered in this manner can include any action, combination of actions, or series of actions usefully carried-out by a work vehicle. Two primary examples of such detent-triggered work vehicle functions, as discussed in detail below, include automated movement routines performed by work vehicles and placement of work vehicles in varying modes of operation.

Embodiments of the work vehicle MRF joystick system include a processing sub-system or "controller architecture," which is operably coupled to an MRF joystick resistance mechanism; that is, a mechanism or damper containing a magnetorheological fluid and capable of modifying the rheology (viscosity) of the fluid through variations in the strength of an electromagnetic (EM) field to provide controlled adjustments to the resistive force impeding joystick motion in at least one degree of freedom (DOF). This resistive force is referred to below as an "MRF resistance force," while the degree to which an MRF resistance force impedes joystick motion in a particular direction or combination of directions is referred to as the "joystick stiffness." During operation of the MRF joystick system, the controller architecture may command the MRF joystick resistance mechanism to apply various different resistive effects selectively impeding joystick rotation or other joystick motion in any given direction, over any given range of travel of the joystick, and through the application of varying magnitudes of resistive force. To generate an MRF detent, the controller architecture monitors joystick movement and commands the MRF joystick resistance mechanism to increase the MRF resistance force and, therefore, joystick stiffness) when an operator moves the joystick into or through a predetermined detent position. The controller architecture further commands the MRF joystick resistance mechanism to lessen or remove the MRF resistance force when the operator moves the joystick from the predetermined detent position to generate a localized region of increased resistance to joystick movement serving as the detent.

In certain instances, the controller architecture may activate a work vehicle function corresponding to a particular MRF detent when an operator moves a joystick past or through a joystick position at which an MRF detent is generated. This may be referred to as "pushing past" an MRF detent or moving the joystick "through" the MRF detent. In other instances, the controller architecture may activate a detent-triggered work vehicle function when an operator maintains a self-centering joystick in a given MRF detent position for a predetermined period of time; e.g., on the order of a few seconds. As another possibility, an operator may perform one of the actions above, while simultaneously performing a second input action (e.g., depressing a button located on or adjacent the joystick) to activate a particular detent-triggered work vehicle function. In still other instances, a different detent-relative joystick movement pattern (e.g., moving a joystick quickly between two detents) may be utilized to selectively activate a given detent-triggered work vehicle function. In each of the instances above, the MRF joystick system selectively activates or executes a designated function of the work vehicle based, at least in part on, joystick movement relative to at least one MRF detent. Further, the MRF detents may be generated on a substantially continuous basis during work vehicle operation; or, instead, only in selected instances, such as when the work vehicle is placed in a particular mode, when an operator provides input activating the MRF detents, or when onboard sensors detect a particular condition or operational aspect of the work vehicle.

As indicated above, various automated movement routines may be chosen as a detent-triggered work vehicle function in embodiments, whether by default or based upon operator programming of the MRF detents. As appearing herein, the term "automated movement routine" refers to a specific movement, concurrent movements, or a movement sequence carried-out by a work vehicle in an automated manner (that is, without requiring operator input) following activation of the movement routine. Examples of automated movement routines include automated turning of joystick-steered work vehicles, such as through the execution of track counter-rotation maneuvers (in the case of tracked work vehicles capable of turning by track counter-rotation) and jump turn sequences (in the case of excavators). Other automated movement routines may entail automatically moving an implement or tool, such as a boom-mounted implement or an earth-moving blade, into a preset position. As a more specific example, joystick movement relative to one or more MRF detents may be utilized to selectively execute a kick-out function of a wheel loader, a skid steer loader (SSL), a backhoe, an excavator, a feller-buncher, or another work vehicle. When implemented, such a kick-out function causes (e.g., through appropriate command signals sent to cylinder actuators) a front end loader (FEL) bucket or other boom-mounted implement to be automatically moved into a raised or lowered preset position.

Further examples of detent-triggered work vehicle functions include placement of a work vehicle in a particular mode of operation (herein, an "operator-selected control mode"). Depending upon implementation, selection of a particular control mode may alter the work vehicle functions controlled utilizing a given MRF joystick device or devices. For example, in embodiments in which the MRF joystick system is integrated into an excavator (or similar work vehicle) having a hinged boom assembly, joystick motion relative to at least one MRF detent may selectively place the excavator in a travel mode in which the joystick devices can be utilized to pilot the excavator rather than control movement of the boom assembly. In other instances in which the work vehicle contains electrohydraulic (EH) actuation system utilized to animate a boom assembly or otherwise move an implement attached to the work vehicle, the operator-selected control mode may be a particular, non-default hydraulic flow priority mode. When such a hydraulic flow priority mode is selected, the EH actuation system may be actuated (e.g., via movement of a spool or other valve element) to vary the routing scheme by which pressurized hydraulic fluid is delivered to hydraulic cylinders contained in the EH actuation system. Similarly, in embodiments, joystick movement relative to the MRF detents may be utilized to selectively place a work vehicle in a lift mode in which a pressure limit of the EH actuation system is increased, while a maximum pump flow of the EH actuation system is decreased; or in a pressure boost mode in which a circuit pressure within the EH actuation system is temporarily increased. In the latter instance, the MRF detent (or detents) enabling entry into the pressure boost mode may be selectively generated when, for example, the controller architecture determines that the boom assembly has encountered a stall condition preventing or impeding further movement of the boom assembly in a particular direction. Still other modes that may be selectively activated based upon detent-relative joystick movement include entry into a travel speed boost mode in which the controller architecture temporarily increases a power output of a work vehicle engine to allow the work vehicle to travel at higher ground speeds.

In the above-described manner, embodiments of the MRF joystick system enhance joystick capabilities enabling operators to readily execute key work vehicle functions when desired, while maintaining physical contact with the joystick device(s) utilized to control a given work vehicle. Operator convenience, comfort, safety, and overall efficiency in piloting the work vehicle may be improved as a result. Further benefits are achieved through the usage of MRF technology as opposed to the usage of other resistance mechanisms, such as actuated friction or brake mechanisms, potentially capable of selectively impeding joystick motion when returning to a centered position after displacement therefrom. Such benefits may include highly abbreviated response times; minimal frictional losses in the absence of MRF-applied resistive forces; reliable, essentially noiseless operation; and other benefits as further discussed below. Additionally, embodiments of the below-described MRF joystick resistance mechanism may be capable of generating a continuous range of resistive forces over a resistive force range in relatively precise manner and in accordance with commands or control signals issued by the controller architecture of the MRF joystick system. This, in turn, may allow detent features of an MRF joystick device to be selectively added, removed, repositioned, and adjusted in force during operation of the work vehicle MRF joystick system to provide a high level of customization and design flexibility.

Example embodiments of a work vehicle MRF joystick system will now be described in conjunction with FIGS. 1-6. In the below-described example embodiments, the MRF joystick system is principally discussed in the context of a particular type of work vehicle, namely, an excavator. Additionally, in the following example, the MRF joystick system includes two joystick devices, which each have a joystick rotatable about two perpendicular axes and which are utilized to control movement of the excavator boom assembly and the implement (e.g., bucket, grapple, or hydraulic hammer) attached thereto. The following example notwithstanding, the MRF joystick system may include a greater or lesser number of joysticks in further embodiments, with each joystick device movable in any number of DOFs and along any suitable motion pattern; e.g., in alternative implementations, a given joystick device may be rotatable about a single axis or, perhaps, movable along a limited (e.g., H-shaped) track or motion pattern. Moreover, the below-described MRF joystick system can be deployed on wide range of work vehicles including joystick-controlled functions, additional examples of which are discussed below in connection with FIG. 7.

Example MRF Joystick System Enabling Detent-Triggered Work Vehicle Functions

Referring initially to FIG. 1, an example work vehicle (here, an excavator 20) is equipped with a work vehicle MRF joystick system 22. In addition to the MRF joystick system 22, the excavator 20 includes a boom assembly 24 terminating in a tool or implement, such a bucket 26. Various other implements can be interchanged with the bucket 26 and attached to the terminal end of the boom assembly 24 including, for example, other buckets, grapples, and hydraulic hammers. The excavator 20 features a body or chassis 28, a tracked undercarriage 30 supporting the chassis 28, and a cabin 32 located at forward portion of the chassis 28 and enclosing an operator station. The excavator boom assembly 24 extends from the chassis 28 and contains, as principal structural components, an inner or proximal boom 34 (hereafter, "the hoist boom 34"), an outer or distal boom 36 (hereafter, "the dipperstick 36"), and a number of hydraulic cylinders 38, 40, 42. The hydraulic cylinders 38, 40, 42 include, in turn, two hoist cylinders 38, a dipperstick cylinder 40, and a bucket cylinder 42. Extension and retraction of the hoist cylinders 38 rotates the hoist boom 34 about a first pivot joint at which the hoist boom 34 is joined to the excavator chassis 28, here at location adjacent (to the right of) the cabin 32. Extension and retraction of the dipperstick cylinder 40 rotates the dipperstick 36 about a second pivot joint at which the dipperstick 36 is joined to the hoist boom 34. Finally, extension and retraction of the bucket cylinder 42 rotates or "curls" the excavator bucket 26 about a third pivot joint at which the bucket 26 is joined to the dipperstick 36.

The hydraulic cylinders 38, 40, 42 are included in an electrohydraulic (EH) actuation system 44, which is encompassed by a box 46 entitled "actuators for joystick-controlled functions" in FIG. 1. Movements of the excavator boom assembly 24 are controlled utilizing at least one joystick located within the excavator cabin 32 and included in the MRF joystick system 22. Specifically, an operator may utilize the joystick or joysticks included in the MRF joystick system 22 to control the extension and retraction of the hydraulic cylinders 38, 40, 42, as well as to control the swing action of the boom assembly 24 via rotation of the excavator chassis 28 relative to the tracked undercarriage 30. The depicted EH actuation system 44 also contains various other non-illustrated hydraulic components, which may include flow lines (e.g., flexible hoses), check or relief valves, pumps, a, fittings, filters, and the like. Additionally, the EH actuation system 44 contains electronic valve actuators and flow control valves, such as spool-type multi-way valves, which can be modulated to regulate the flow of pressurized hydraulic fluid to and from the hydraulic cylinders 38, 40, 42. This stated, the particular construction or architecture of the EH actuation system 44 is largely inconsequential to embodiments of the present disclosure, providing that the below-described controller architecture 50 is capable of controlling movement of the boom assembly 24 via commands transmitted to selected ones of the actuators 46 effectuating the joystick controlled functions of the excavator 20.

As schematically illustrated in an upper left portion of FIG. 1, the work vehicle MRF joystick system 22 contains one or more MRF joystick devices 52, 54. As appearing herein, the term "MRF joystick device" refers to an operator input device including at least one joystick or control lever, the movement of which can be impeded by a variable resistance force or "stiffness force" applied utilizing an MRF joystick resistance mechanism of the type described herein. While one such MRF joystick device 52 is schematically shown in FIG. 1 for clarity, the MRF joystick system 22 can include any practical number of joystick devices, as indicated by symbol 58. In the case of the example excavator 20, the MRF joystick system 22 will typically include two joystick devices; e.g., joystick devices 52, 54 described below in connection with FIG. 2. The manner in which two such joystick devices 52, 54 may be utilized to control movement of the excavator boom assembly 24 is further discussed below. First, however, a general discussion of the joystick device 52, as schematically illustrated in FIG. 1, is provided to establish a general framework in which embodiments of the present disclosure may be better understood.

As schematically illustrated in FIG. 1, the MRF joystick device 52 includes a joystick 60 mounted to a lower support structure or base housing 62. The joystick 60 is movable relative to the base housing 62 in at least one DOF and may be rotatable relative to the base housing 62 about one or more axes. In the depicted embodiment, and as indicated by arrows 64, the joystick 60 of the MRF joystick device 52 is rotatable relative to the base housing 62 about two perpendicular axes and will be described below as such. The MRF joystick device 52 includes one or more joystick position sensors 66 for monitoring the current position and movement of the joystick 60 relative to the base housing 62. Various other components 68 may also be included in the MRF joystick device 52 including buttons, dials, switches, or other manual input features, which may be located on the joystick 60 itself, located on the base housing 62, or a combination thereof. Spring elements (gas or mechanical), magnets, or fluid dampers may be incorporated into the joystick device 52 to provide a desired rate of return to a home position of the joystick, as well as to fine-tune the desired feel of the joystick 60 perceived by an operator when interacting with the MRF joystick device 52. Such mechanisms are referred to herein as "joystick bias mechanisms" and may be contained within in the MRF joystick device 52 when having a self-centering design. In more complex components, various other components (e.g., potentially including one or more artificial force feedback (AFF) motors) can also be incorporated into the MRF joystick device 52. In other implementations, such components may be omitted from the MRF joystick device 52.

An MRF joystick resistance mechanism 56 is at least partially integrated into the base housing 62 of the MRF joystick device 52. The MRF joystick resistance mechanism 56 (and the other MRF joystick resistance mechanisms mentioned in this document) may also alternatively be referred to as an "MRF damper," as an "MRF brake device," or simply as an "MRF device." The MRF joystick resistance mechanism 56 can be controlled to adjust the MRF resistance force and, therefore, joystick stiffness resisting joystick motion relative to the base housing 62 in at least one DOF. During operation of the MRF joystick system 22, the controller architecture 50 may selectively command the MRF joystick resistance mechanism 56 to increase the joystick stiffness impeding joystick rotation about a particular axis or combination of axes. As discussed more fully below, the controller architecture 50 may command the MRF joystick resistance mechanism 56 to increase joystick stiffness, when appropriate to perform any one of a number of enhanced joystick functionalities, by increasing the strength of an EM field in which a magnetorheological fluid contained in the MRF joystick resistance mechanism 56 is at least partially immersed. A generalized example of one manner in which the MRF joystick resistance mechanism 56 may be realized is described below in connection with FIGS. 3 and 4.

The excavator 20 is further equipped with any number of onboard sensors 70. Such sensors 70 may include sensors contained in an obstacle detection system, which may be integrated into the excavator 20 in embodiments. The non-joystick input sensors 70 may further include any number and type of boom assembly sensors 72, such as boom assembly tracking sensors suitable for tracking the position and movement of the excavator boom assembly 24. Such sensors can include rotary or linear variable displacement transducers integrated into excavator boom assembly 24 in embodiments. For example, in one possible implementation, rotary position sensors may be integrated into the pivot joints of the boom assembly 24; and the angular displacement readings captured by the rotary position sensors, taken in conjunction with known dimensions of the boom assembly 24 (as recalled from the memory 48), may be utilized to track the posture and position of the boom assembly 24 (including the bucket 26) in three dimensional space. In other instances, the extension and reaction of the hydraulic cylinders 38, 40, 42 may be measured (e.g., utilizing linear variable displacement transducers) and utilized to calculate the current posture and positioning of the excavator boom assembly 24. Other sensor inputs can also be considered by the controller architecture 50 in addition or lieu of the aforementioned sensor readings, such as inertia-based sensor readings; e.g., as captured by inertia sensors, such as MEMS gyroscopes, accelerometers, and possibly magnetometers packaged as IMUs, which are affixed to the excavator 20 at various locations. For example, IMUs can be affixed to the excavator chassis 28 and one or more locations (different linkages) of the excavator boom assembly 24. Vision systems capable of tracking of the excavation implement or performing other functions related to the operation of the excavator 20 may also be included in the onboard board sensors 70 when useful in performing the functions described below.

One or more load measurement sensors, such as weight- or strain-based sensors (e.g., load cells), may further be included in the non joystick sensor inputs 70 in at least some implementations of the work vehicle MRF joystick system 22. In embodiments, such load measurement sensors may be utilized to directly measure the load carried by the bucket 26 (generally, a "load-moving implement" or "load-carrying implement") at any given time during excavator operation. The load measurement sensors can also measure other parameters (e.g., one or more hydraulic pressures within the EH actuation system 44) indicative of the load carried by the boom assembly 24 in embodiments. In other realizations, the MRF joystick system 22 may be integrated into a work vehicle having a bed or tank for transporting a material, such as the bed of an articulated dump truck. In this latter case, the load measurement sensors included in the sensors 70 may assume the form of payload weighing sensors capable of weighing or approximating the weight of material carried within the bed or tank of the work vehicle at any particular juncture in time.

In embodiments, the work vehicle sensors 70 may further include a number of vehicle motion data sources 74. The vehicle motion data sources 74 can include any sensors or data sources providing information pertaining to changes in the position, speed, heading, or orientation of the excavator 20. Again, MEMS gyroscopes, accelerometers, and possibly magnetometers packaged IMUs can be utilized to detect and measure such changes. Inclinometers or similar sensors may be employed to monitor the orientation of the excavator chassis 28 or portions of the boom assembly 24 relative to gravity in embodiments. The vehicle motion data sources 74 may further include Global Navigation Satellite System (GNSS) modules, such as Global Positioning System (GPS) modules, for monitoring excavator position and motion states. In embodiments, the vehicle motion data sources 74 may also include sensors from which the rotational rate of the undercarriage tracks may be calculated, electronic compasses for monitoring heading, and other such sensors. The vehicle motion data sources 74 can also include various sensors for monitoring the motion and position of the boom assembly 24 and the bucket 26, including MEMS devices integrated into the boom assembly 24 (as previously noted), transducers for measuring angular displacements at the pin joints of the boom assembly, transducers for measuring the stroke of the hydraulic cylinders 38, 40, 42, and the like.

Embodiments of the MRF joystick system 22 may further include any number of other non-joystick components 76 in addition to those previously described. Such additional non-joystick components 76 may include an operator interface 78 (distinct from the MRF joystick device 52), a display device 80 located in the excavator cabin 32, and various other types of non-joystick sensors 82. The operator interface 78, in particular, can include any number and type of non joystick input devices for receiving operator input, such as buttons, switches, knobs, and similar manual inputs external to the MRF joystick device 52. Such input devices included in the operator interface 78 can also include cursor-type input devices, such as a trackball or joystick, for interacting with a graphical user interface (GUI) generated on the display device 80. The display device 80 may be located within the cabin 32 and may assume the form of any image-generating device on which visual alerts and other information may be visually presented. The display device 80 may also generate a GUI for receiving operator input or may include other inputs (e.g., buttons or switches) for receiving operator input, which may be pertinent to the controller architecture 50 when performing the below-described processes. In certain instances, the display device 80 may also have touch input capabilities.

Finally, the MRF joystick system 22 can include various other non-joystick sensors 82, which provide the controller architecture 50 with data inputs utilized in carrying-out the below-described processes. For example, the non-joystick sensors 82 can include sensors for automatically determining the type of implement currently attached to the excavator 20 (or other work vehicle) in at least some implementations when this information is considered by the controller architecture 50 in determining when to increase joystick stiffness to perform certain enhanced joystick functions described herein; e.g., such sensors 82 may determine a particular implement type currently attached to the excavator 20 by sensing a tag (e.g., a radio frequency identification tag) or reading other identifying information present on the implement, by visual analysis of a camera feed capturing the implement, or utilizing any other technique. In other instances, an operator may simply enter information selecting the implement type currently attached to the boom assembly 24 by, for example, interacting with a GUI generated on the display device 80. In still other instances, such other non-joystick sensors 82 may include sensors or cameras capable of determining when an operator grasps or other contacts the joystick 60. In other embodiments, such sensors may not be contained in the MRF joystick system 22.

As further schematically depicted in FIG. 1, the controller architecture 50 is associated with a memory 48 and may communicate with the various illustrated components over any number of wired data connections, wireless data connections, or any combination thereof; e.g., as generically illustrated, the controller architecture 50 may receive data from various components over a centralized vehicle or a controller area network (CAN) bus 84. The term "controller architecture," as appearing herein, is utilized in a non-limiting sense to generally refer to the processing subsystem of a work vehicle MRF joystick system, such as the example MRF joystick system 22. Accordingly, the controller architecture 50 can encompass or may be associated with any practical number of processors, individual controllers, computer-readable memories, power supplies, storage devices, interface cards, and other standardized components. In many instances, the controller architecture 50 may include a local controller directly associated with the joystick interface and other controllers located within the operator station enclosed by the cabin 32, with the local controller communicating with other controllers onboard the excavator 20 as needed. The controller architecture 50 may also include or cooperate with any number of firmware and software programs or computer-readable instructions designed to carry-out the various process tasks, calculations, and control functions described herein. Such computer-readable instructions may be stored within a non-volatile sector of the memory 48 associated with (accessible to) the controller architecture 50. While generically illustrated in FIG. 1 as a single block, the memory 48 can encompass any number and type of storage media suitable for storing computer-readable code or instructions, as well as other data utilized to support the operation of the MRF joystick system 22. The memory 48 may be integrated into the controller architecture 50 in embodiments as, for example, a system-in-package, a system-on-a-chip, or another type of microelectronic package or module.

Figure 2:
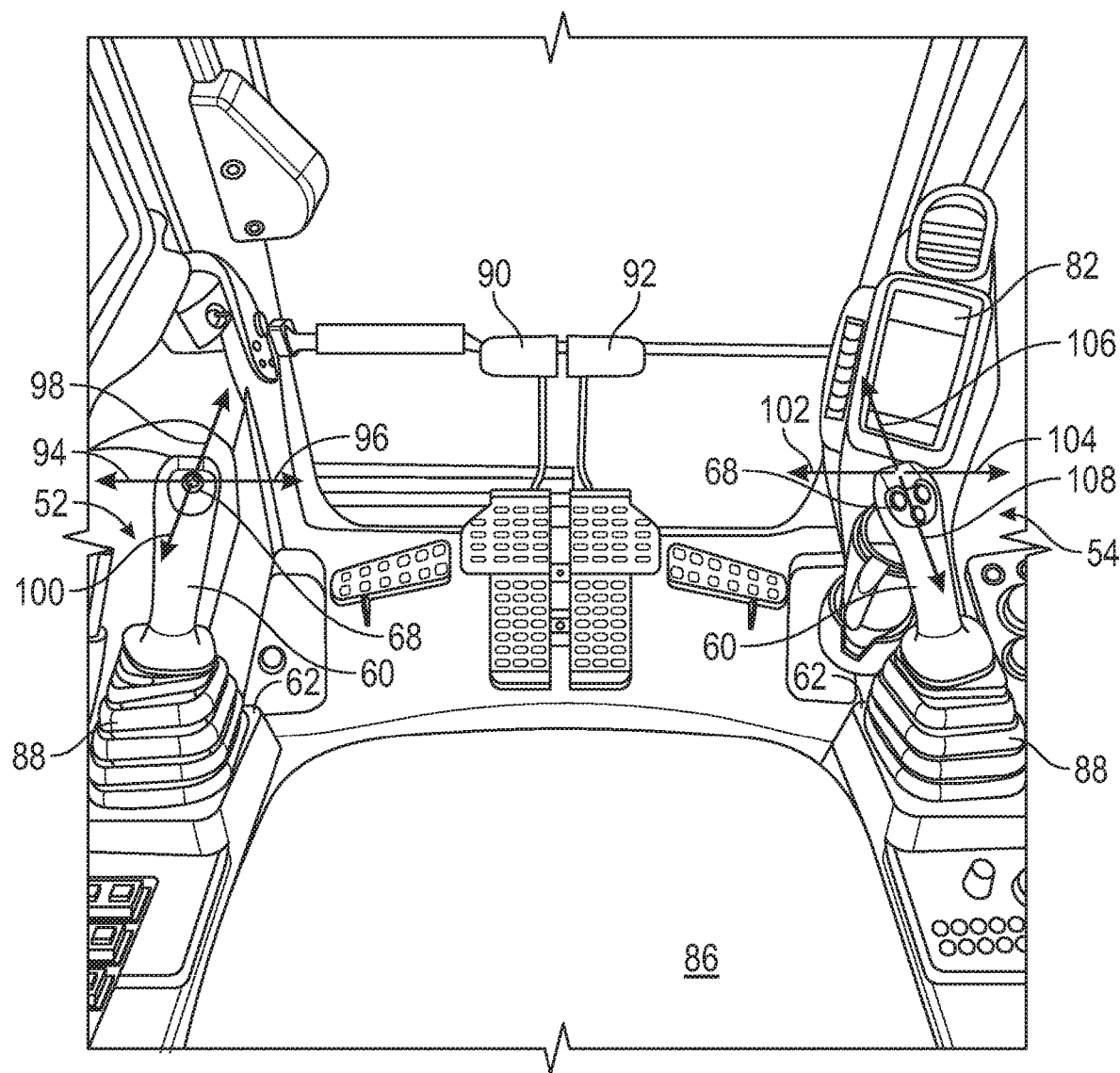
FIG. 2 is a perspective view from within the excavator cabin shown in FIG. 1 illustrating two joystick devices, which may be included in the example MRF joystick system and utilized by an operator to control movement of the excavator boom assembly.

Discussing the joystick configuration or layout of the excavator 20 in greater detail, the number of joystick devices included in the MRF joystick system 22, and the structural aspects and function of such joysticks, will vary amongst embodiments. As previously mentioned, although only a single joystick device 52 is schematically shown in FIG. 1, the MRF joystick system 22 will typically two joystick devices 52, 54 supporting excavator boom assembly control. Further illustrating this point, FIG. 2 provides a perspective view from within the excavator cabin 32 depicting two MRF joystick devices 52, 54 suitably included in embodiments of the MRF joystick system 22. As can be seen, the MRF joystick devices 52, 54 are positioned on opposing sides of an operator seat 86 such that an operator, using both hands, can concurrently manipulate the left MRF joystick device 52 and the right joystick device 54 with relative ease. Carrying forward the reference numerals introduced above in connection with FIG. 1, each joystick device 52, 54 includes a joystick 60 mounted to a lower support structure or base housing 62 for rotation relative to the base housing 62 about two perpendicular axes. The joystick devices 52, 54 also each include a flexible cover or boot 88 joined between a lower portion of the joysticks 60 and their respective base housings 62. Additional joystick inputs are also provided on each joystick 60 in the form of thumb-accessible buttons and, perhaps, as other non-illustrated manual inputs (e.g., buttons, dials, and or switches) provided on the base housings 62. Other notable features of the excavator 20 shown in FIG. 2 include the previously-mentioned display device 80 and pedal/control lever mechanisms 90, 92 for controlling the respective movement of the right and left tracks of the tracked undercarriage 30.

Different control schemes can be utilized to translate movement of the joysticks 60 included in the joystick devices 52, 54 to corresponding movement of the excavator boom assembly 24. In many instances, the excavator 20 will support boom assembly control in either (and often allow switching between) a "backhoe control" or "SAE control" pattern and an "International Standard Organization" or "ISO" control pattern. In the case of the backhoe control pattern, movement of the left joystick 60 to the operator's left (arrow 94) swings the excavator boom assembly 24 in a leftward direction (corresponding to counter-clockwise rotation of the chassis 28 relative to the tracked undercarriage 30), movement of the left joystick 60 to the operator's right (arrow 96) swings the boom assembly 24 in a rightward direction (corresponding to clockwise rotation of the chassis 28 relative to the tracked undercarriage 30), movement of the left joystick 60 in a forward direction (arrow 98) lowers the hoist boom 34, and movement of the left joystick 60 in an aft or rearward direction (arrow 100) raises the hoist boom 34. Also, in the case of the backhoe control pattern, movement of the right joystick 60 to the left (arrow 102) curls the bucket 26 inwardly, movement of the right joystick 60 to the right (arrow 104) uncurls or "opens" the bucket 26, movement of the right joystick 60 in a forward direction (arrow 106) rotates the dipperstick 36 outwardly, and movement of the right joystick 60 in an aft or rearward direction (arrow 108) rotates the dipperstick 36 inwardly. Comparatively, in the case of an ISO control pattern, the joystick motions for the swing commands and the bucket curl commands are unchanged, while the joystick mappings of the hoist boom and dipperstick are reversed. Thus, in the ISO control pattern, forward and aft movement of the left joystick 60 controls the dipperstick rotation in the previously described manner, while forward and aft movement of the right joystick 60 controls motion (raising and lowering) of the hoist boom 34 in the manner described above.

Figure 3:
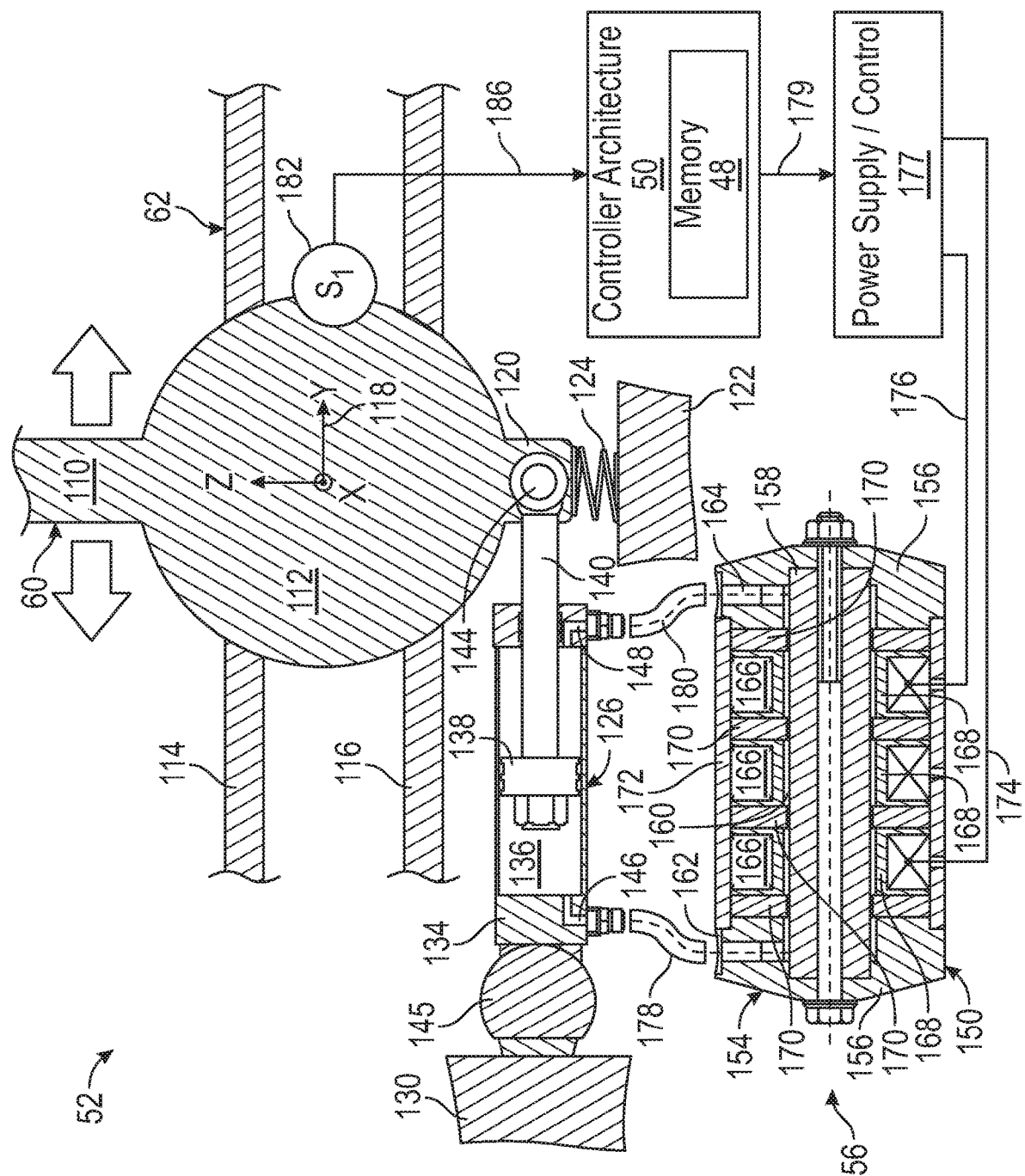
FIGS. 3 and 4 are cross-sectional schematics of the example MRF joystick system, as partially shown and taken along perpendicular section planes through a joystick included in a joystick device, illustrating one possible construction of the MRF joystick system.
Figure 4:
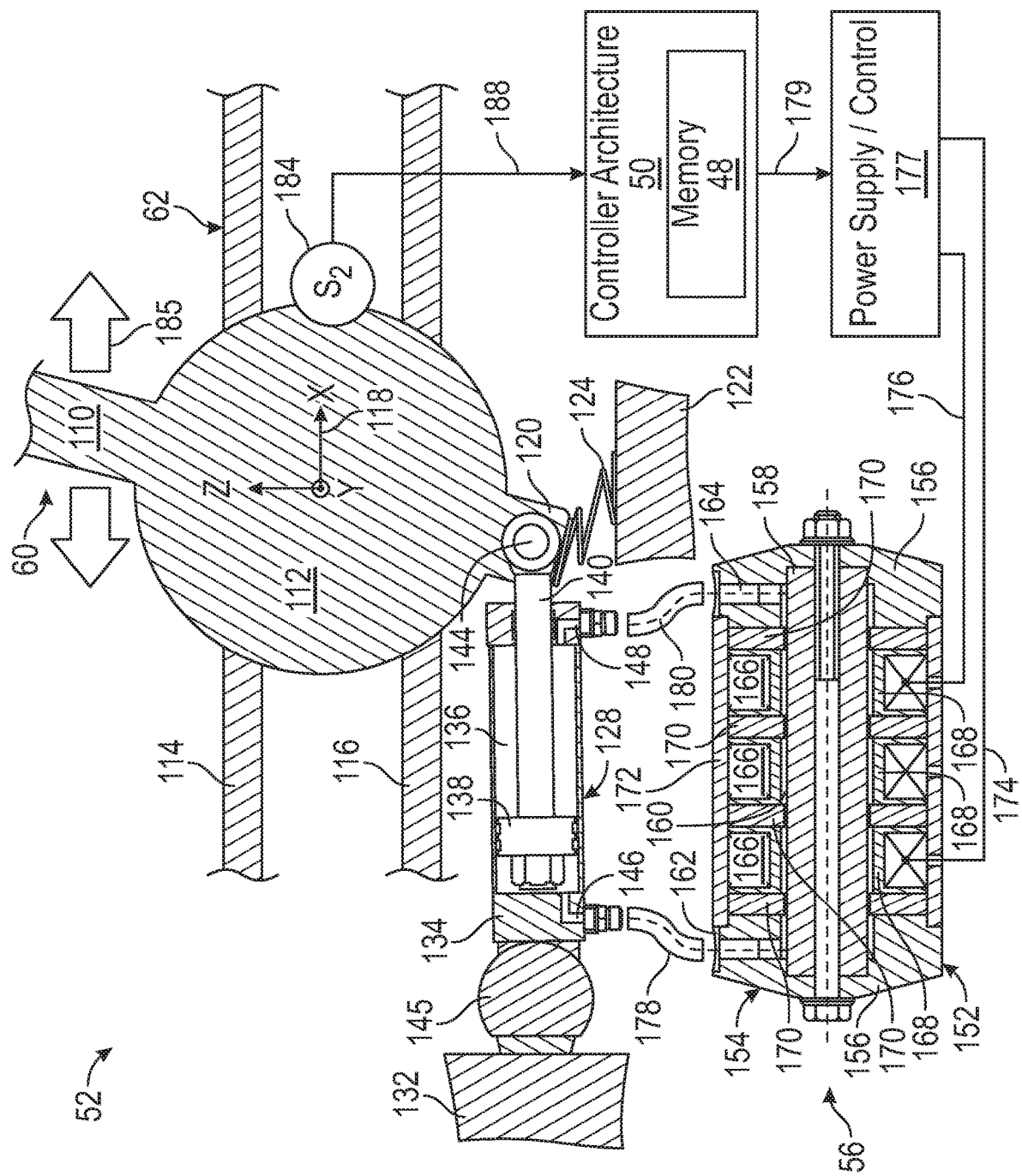

Turning now to FIGS. 3 and 4, an example construction of the MRF joystick device 52 and the MRF joystick resistance mechanism 56 is represented by two simplified cross-sectional schematics. While these drawing figures illustrate a single MRF joystick device (i.e., the MRF joystick device 52), the following description is equally applicable to the other MRF joystick device 54 included in the example MRF joystick system 22. The following description is provided by way of non-limiting example only, noting that numerous different joystick designs incorporating or functionally cooperating with MRF joystick resistance mechanisms are possible. The particular composition of the magnetorheological fluid largely is also inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight. Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 3 and 4, and again carrying forward the previously-introduced reference numerals as appropriate, the MRF joystick device 52 includes a joystick 60 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 60 is captured between two walls 114, 116 of the base housing 62, which may extend substantially parallel to one another to form an upper portion of the base housing 62. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 60 relative to the base housing 62 about two perpendicular axes, which correspond to the X- and Y-axes of a coordinate legend 118 appearing in FIGS. 3 and 4; while generally preventing translational movement of the joystick 60 along the X-, Y-, and Z-axes of the coordinate legend 118. In further embodiments, various other mechanical arrangements can be employed to mount a joystick to a base housing, while allowing rotation of the joystick about two perpendicular axes, such as a gimbal arrangement. In less complex embodiments, a pivot or pin joint may be provided to permit rotation of the joystick 60 relative to the base housing 62 about a single axis.

The joystick 60 of the MRF joystick device 52 further includes a stinger or lower joystick extension 120, which projects from the generally spherical base 112 in a direction opposite the joystick handle 110. The lower joystick extension 120 is coupled to a static attachment point of the base housing 62 by a single centering or return spring 124 in the illustrated schematic; here noting that such an arrangement is simplified for the purposes of illustration and more complex spring return arrangements (or other joystick biasing mechanisms, if present) will typically be employed in actual embodiments of the MRF joystick device 52. When the joystick 60 is displaced from the neutral or home position shown in FIG. 3, the return spring 124 deflects as shown in FIG. 4 to urge return of the joystick 60 to the home position (FIG. 3). Consequently, as an example, after rotation into the position shown in FIG. 4, the joystick 60 will return to the neutral or home position shown in FIG. 3 under the influence of the return spring 124 should the work vehicle operator subsequently release the joystick handle 110. In other embodiments, the MRF joystick device 52 may not be self-centering and may, instead, assume the form a friction-hold joystick remaining at a particular position absent an operator-applied force moving the joystick from the position.

The example MRF joystick resistance mechanism 56 includes a first and second MRF cylinders 126, 128 shown in FIGS. 3 and 4, respectively. The first MRF cylinder 126 (FIG. 3) is mechanically joined between the lower joystick extension 120 and a partially-shown, static attachment point or infrastructure feature 130 of the base housing 62. Similarly, the second MRF cylinder 128 (FIG. 4) is mechanically joined between the lower joystick extension 120 and a static attachment point 132 of the base housing 62, with the MRF cylinder 128 rotated relative to the MRF cylinder 126 by approximately 90 degrees about the Z-axis of the coordinate legend 118. Due to this structural configuration, the MRF cylinder 126 (FIG. 3) is controllable to selectively resist rotation of the joystick 60 about the X-axis of coordinate legend 118, while the MRF cylinder 128 (FIG. 4) is controllable to selectively resist rotation of the joystick 60 about the Y-axis of coordinate legend 118. Additionally, both MRF cylinders 126, 128 can be jointly controlled to selectively resist rotation of the joystick 60 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 60 about only the X-axis or only the Y-axis, or in implementations in which joystick 60 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 60. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF values 150, 152, respectively, via flow line connections 178, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 56 to apply resistance forces restricting or impeding joystick motion may be compromised; however, the joystick 60 will remain freely rotatable about the X- and Y-axes in a manner similar to a traditional, non-MRF joystick system, and the MRF joystick device 52 will remain capable of controlling the excavator boom assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 3 and 4 by lines 174, 176. As indicated by arrows 179, the controller architecture 50 is operably coupled to the power supply and control source 177 in a manner enabling the controller architecture 50 to control the source 177 to vary the current supplied to or the voltage applied across the EM coils 166 during operation of the MRF joystick system 22. This structural arrangement thus allows the controller architecture 50 to command or control the MRF joystick resistance mechanism 56 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits 178, 180, respectively. The conduits 178, 180 may be, for example, lengths of flexible tubing having sufficient slack to accommodate any movement of the MRF cylinders 126, 128 occurring in conjunction with rotation of the joystick 60. Consider, in this regard, the example scenario of FIG. 4. In this example, an operator has moved the joystick handle 110 in an operator input direction (indicated by arrow 185) such that the joystick 60 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 4 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 50 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 56, the controller architecture 50 can control the MRF joystick resistance mechanism 56 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 50 can likewise control the MRF joystick resistance mechanism 56 to selectively provided such resistance effects as the piston 138, 140 included in the MRF valve 150 strokes in conjunction with rotation of the joystick 60 about the X-axis of coordinate legend 118. Moreover, the MRF joystick resistance mechanism 56 may be capable of independently varying the EM field strength generated by the EM coils 166 within the MRF valves 150, 152 to allow independent control of the MRF resistance forces impeding joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 60 relative to the base housing 62. In the illustrated example, specifically, the MRF joystick device 52 includes a first joystick position sensor 182 (FIG. 3) for monitoring rotation of the joystick 60 about the X-axis of coordinate legend 118, and a second joystick position sensor 184 (FIG. 4) for monitoring rotation of the joystick 60 about the Y-axis of coordinate legend 118. The data connections between the joystick position sensors 182, 184 and the controller architecture 50 are represented by lines 186, 188, respectively. In further implementations, the MRF joystick device 52 can include various other non-illustrated components, as can the MRF joystick resistance mechanism 56. Such components can include operator inputs and corresponding electrical connections provided on the joystick 60 or the base housing 62, AFF motors, and pressure and/or flow rate sensors included in the flow circuit of the MRF joystick resistance mechanism 56, as appropriate, to best suit a particular application or usage.

As previously emphasized, the above-described embodiment of the MRF joystick device 52 is provided by way of non-limiting example only. In alternative implementations, the construction of the joystick 60 can differ in various respects. So too may the MRF joystick resistance mechanism 56 differ in further embodiments relative to the example shown in FIGS. 3 and 4, providing that the MRF joystick resistance mechanism 56 is controllable by the controller architecture 50 to selectively apply a resistance force (through changes in the rheology of a magnetorheological fluid) impeding movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 3 and 4), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 60 itself, such as the spherical base 112 in the case of the joystick 60, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 56, the usage of MRF technology to selectively generate a variable MRF resistance force or joystick stiffness impeding (resisting or preventing) targeted joystick motions provides several advantages. As a primary advantage, the MRF joystick resistance mechanism 56 (and MRF joystick resistance mechanism generally) are highly responsive and can effectuate desired changes in EM field strength, in the rheology of the magnetorheological fluid, and ultimately in the MRF-applied joystick stiffness impeding joystick motions in highly abbreviated time periods; e.g., time periods on the order of 1 millisecond in certain instances. Correspondingly, the MRF joystick resistance mechanism 56 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 50 can further control the MRF joystick resistance mechanism 56 to generate the MRF resistance force to have a continuous range of strengths or intensities, within limits, through corresponding changes in the strength of the EM field generated utilizing the EM coils 166. Beneficially, the MRF joystick resistance mechanism 56 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 56 allows the MRF joystick system 22 to selectively generate a first resistance force or joystick stiffness deterring joystick rotation about a first axis (e.g., the X-axis of coordinate legend 118 in FIGS. 3 and 4), while further selectively generating a second resistance force or joystick stiffness deterring joystick rotation about a second axis (e.g., the Y-axis of coordinate legend 118) independently of the first resistance force (joystick stiffness); that is, such that the first and second resistance forces have different magnitudes, as desired.

Figure 5:
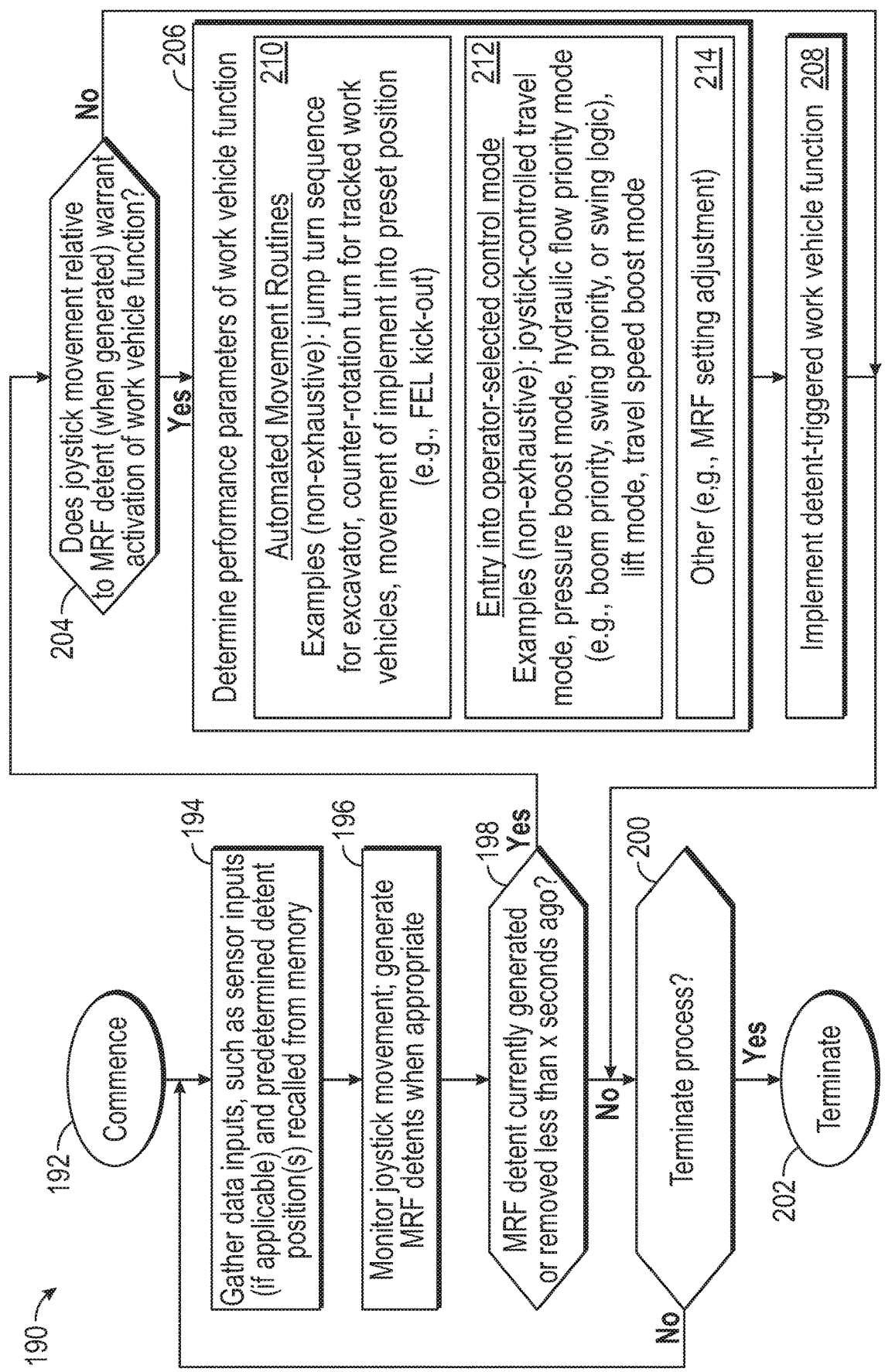
FIG. 5 is a process suitably carried-out by the controller architecture of the MRF joystick system shown in FIG. 1 to selectively activate work vehicle functions based on joystick movement relative to one or more MRF detents when generated.

Discussing now to FIG. 5, there is shown an example process 190 suitably carried-out by the controller architecture 50 of the MRF joystick system 22 to selectively execute one or more detent-triggered work vehicle functions in response to detent-relative joystick motions. The illustrated process 190 (hereafter, the "MRF detent control process 190") includes a number of process STEPS 192, 194, 196, 198, 200, 202, 204, 206, 208, each of which is described, in turn, below. Depending upon the particular manner in which the MRF detent control process 190 is implemented, each step generically illustrated in FIG. 5 may entail a single process or multiple sub-processes. Further, the steps illustrated in FIG. 5 and described below are provided by way of non-limiting example only. In alternative embodiments of the MRF detent control process 190, additional process steps may be performed, certain steps may be omitted, and/or the illustrated process steps may be performed in alternative sequences.

The example MRF detent control process 190 commences at STEP 192 in response to the occurrence of a predetermined trigger event. In embodiments, the trigger event can be startup of a work vehicle, placement of the work vehicle in a particular mode of operation, or usage of the work vehicle to perform a particular work task. In other instances, the trigger event may be the occurrence of a particular operational condition, such as a stall condition impeding movement of the boom assembly 24 in the case of the example excavator 20 or travel of the excavator 20 (or another work vehicle) at a ground speed exceeding a predetermined threshold, as detected by the controller architecture 50 utilizing the onboard sensors 70. In further instances, the trigger event initiating the process 190 may be the reception of operator input entered via the operator interface 78 indicating any operator desire to activate the MRF detents. In this latter regard, the controller architecture 50 may generate the MRF detents in response to operator actuation of a dedicated physical input, such as button or switch, located on or adjacent a joystick device; e.g., in one approach, MRF detent generation may occur exclusively when an operator depresses a manual input located on the joystick device, such as a button located adjacent the operator's thumb or pointer finger. In still other instances, the trigger event may be entry of operator input (e.g., as received via operator interaction with a GUI generated on the display device 80) requesting placement of the MRF joystick system 22 in an interactive detent control mode.

Following commencement of the MRF detent control process 190, the controller architecture 50 of the MRF joystick system 22 progresses to STEP 194 and collects or gathers the relevant baseline data inputs. Such baseline data inputs may be recalled from memory or detected by the sensors 70 onboard the excavator 20 (or other work vehicle). For example, during STEP 194, the controller architecture 50 may recall one or more predetermined detent positions from the memory 48 for reference in determining the appropriate juncture at which to generate the MRF detents during STEP 196 of the process 190, as described below. The controller architecture 50 may also collect other pertinent information, such as sensor input or operator input, during STEP 194 likewise considered in selectively generating the MRF detents. For example, in this latter regard, the controller architecture 50 may receive sensor data from one or more of the sensors 70 (FIG. 1) indicative of the occurrence of a particular operational condition or performance of a particular work task, such as an excavation task, during which MRF detents may be selectively produced. Further, during STEP 194, operator preference settings specifying adjustments to detent locations, detent intensity, and other such parameters may be recalled from the memory 48 and utilized in carrying-out the remainder of the MRF detent control process 190.

After gathering the pertinent baseline data during STEP 194, the controller architecture 50 advances to STEP 196 and receives data indicative of the current joystick movement and joystick position of the MRF joystick device (or devices) under consideration. For example, in the case of the example excavator 20, the controller architecture 50 receives data from the joystick position sensors 182, 184 contained in the MRF joystick devices 52, 54 regarding the movement and positioning of the respective joysticks 60 (FIG. 2). If determining that an MRF detent is appropriately generated at STEP 196 as an operator rotates a joystick in a particular operator input direction, the controller architecture 50 commands the MRF joystick resistance mechanism 56 to increase the MRF resistance force accordingly. This creates a localized region of increased resistance to further rotation of the affected joystick in at least the operator input direction. Conversely, the controller architecture 50 further command the MRF joystick resistance mechanism 56 to lessen or remove the MRF resistance force when the operator moves the joystick from a predetermined detent position to generate a localized region of increased resistance to joystick movement defining an MRF detent.

Next, at STEPS 198, 204 of the MRF detent control process 190, the controller architecture 50 determines whether joystick movement relative to the MRF detent or detents, when currently or recently generated, convey an operator intent to activate a particular work vehicle function. As indicated in FIG. 5 at STEP 198, the controller architecture 50 may initially determine whether an MRF detent is currently applied by the MRF joystick system 22; or whether an MRF detent was recently applied and removed due to operator-induced joystick movement displacing the joystick from the corresponding detent position. In embodiments, the controller architecture 50 may determine whether an MRF detent is currently applied before advancing to STEP 204 in instances in which a particular detent-triggered work vehicle function is activated by maintaining a given joystick in a detent position for a predetermined duration of time on the order of, for example, a few seconds. Comparatively, the controller architecture 50 may determine whether an MRF detent was initially applied and recently removed in instances in which a particular work vehicle function may be triggered by pushing a joystick through or beyond an MRF detent in the manner previously described. Generally, then, STEP 198 may be performed as a threshold inquiry in embodiments, but may be eliminated in further implementations such that the controller architecture 50 progresses directly to STEP 204 following STEP 196 of the process 190. Further, the above-described joystick motion patterns activating an MRF-triggered work vehicle function are provided by way of example only; any distinct joystick motion relative to one or more MRF detents, potentially combined with other operator input actions (e.g., actuation of a button, a switch, or other manual input), can be utilized to activate a given detent-triggered work vehicle function in further embodiments of the present disclosure.

If determining, during STEP 198, that an MRF detent is currently generated or was removed in a relatively recent timeframe (e.g., on the order of a second), the controller architecture 50 of the MRF joystick system 22 advances to STEP 204 of the MRF detent control process 190. Otherwise, the controller architecture 50 progresses to STEP 200 and next determines whether the current iteration of the MRF detent control process 190 should terminate; e.g., due to work vehicle shutdown, due to continued inactivity of the joystick-controlled function for a predetermined time period, or due to removal of the condition or trigger event in response to which the process 190 initially commenced. If determining that the MRF detent control process 190 should terminate at STEP 200, the controller architecture 50 progresses to STEP 202 of the process 190, and the MRF detent control process 190 terminates accordingly. If instead determining that the process 190 should continue, the controller architecture 50 returns to STEP 194 and the above-described process steps repeat.

When progressing to STEP 204 of the MRF detent control process 190, the controller architecture 50 determines whether the joystick movement relative to one or more MRF detents indicates an operator intent to activate a work vehicle function. If determining that the joystick movement does not warrant activation of the MRF detent-triggered work vehicle function, the controller architecture 50 continues to STEP 200 and determines whether the current iteration of the process 190 should terminate, as previously discussed. If instead determining that the joystick movements warrant activation of a work vehicle function, the controller architecture 50 advances to STEP 206 and establishes the parameters of the detent-triggered work vehicle function to be performed (which is then executed at STEP 208 of the process 190). As noted above, the particular manner in which a joystick is moved relative to the MRF detent or detents to activate a work vehicle function will vary based upon the chosen control scheme, with additional examples presented below. Further, joystick movement relative to one or more MRF detents may not only initiate performance of a particular detent-triggered work vehicle function in embodiments, but may further influence one or more parameters pertaining to the manner in which the work vehicle function is performed. For example, in embodiments in which a particular automated movement routine is activated by moving a joystick through an MRF detent, the rate at which the joystick is moved through the MRF detent or the throw of the joystick (that is, the extent to which the MRF joystick is rotated beyond the MRF detent position) may be at least partially determinative of the speed at which the automated movement routine is carried-out. Accordingly, a given automated movement routine (e.g., a jump turn, a counter-rotation turn, or a kick-out function) may be performed more rapidly when an operator quickly rotates a joystick through a particular MRF detent or rotates the joystick relatively far beyond the MRF detent position in at least some implementations.

Discussing STEPS 204, 206 of the MRF detent control process 190 in greater detail, multiple categories 210, 212, 214 of detent-triggered work vehicle functions are presented in the illustrated example. Addressing the first work vehicle function category 210, any number of automated movement routines can be selectively activated by joystick movement relative to the MRF detents. In embodiments in which the work vehicle assumes the form of an excavator, such as the excavator 20 shown in FIG. 1, joystick movement relative to one more MRF detents may selectively execute an automated jump turn sequence or "gorilla turn" of the excavator; that is, a movement sequence during which the tracked undercarriage 30 of the excavator 20 is rotated in a particular direction by pressing a bucket (or other boom-mounted implement) against the ground and then executing a swing command. The MRF joystick system 22 may generate the MRF detents utilized to activate such a jump turn sequence exclusively when the excavator 20 is placed in the travel mode in which one or more joystick devices (e.g., joystick devices 52, 54 shown in FIG. 2) are utilized to pilot the excavator 20 (that is, to steer and control the speed of the excavator 20) rather than control movement of the boom assembly 24. When the excavator 20 operates in such a travel mode, an operator may rotate a given joystick about a rotational axis in first or second directions to steer the excavator 20 to the left or right, respectively. A first MRF detent may be encountered when rotating the joystick from a center or neutral position about the rotational axis in the first direction. An operator may then continue to rotate the joystick through the first MRF detent in the first direction (and therefore away from the neutral position) to trigger the automatic execution of a jump turn sequence turning the tracked undercarriage 30 of the excavator 20 to the left. In a similar manner, a second MRF detent may be encountered when rotating the joystick from the neutral position about the rotational axis in the second direction, with the excavator (under the influence of the MRF joystick system) performing a jump turn sequence rotating the tracked undercarriage 30 of the excavator 20 to the right should the operator continue to rotate the joystick through the second MRF detent.

In other instances, and still referring to the work vehicle function category 210 shown in FIG. 5, a different automated movement routine may be selectively triggered based, at least in part, on joystick movement relative to one or more MRF detents. For example, in the case of excavator, dozers, tracked loaders, feller-bunchers, and other work vehicles having tracked undercarriages capable of track counter-rotation, joystick movement relative to one or more MRF detents may be utilized to selectively activate a counter-rotation turns of the work vehicle, as further discussed below in connection with FIG. 6. In still other instances, the detent-triggered automated movement routine may involve movement of an implement relative to the chassis of the work vehicle. For example, in embodiments in which the work vehicle is equipped with an implement (e.g., a bucket) attached to the terminal end of a boom assembly (e.g., an FEL assembly of a wheel loader or a hinged boom assembly of an excavator, backhoe, or feller-buncher), such an automated movement routine may involve movement of the boom assembly in a manner bringing the implement into a preset position, such as a particular raised or lower position. As a more specific example, embodiments of the MRF joystick system may selectively execute a kick-out function based upon joystick movement relative to one or more MRF detents, with the kick-out function (when executed) causing a bucket or other implement to be raised or lowered into a preset position; e.g., a default position or a position previously specified by the work vehicle operator. Again, additional description of such kick-out functions is provided below in connection with FIG. 6.

Addressing next detent-triggered work vehicle function category 212, further examples of detent-triggered work vehicle functions include placement of the work vehicle in a particular operator-selected control mode. For example, in certain embodiments, joystick movement relative to one or more MRF detents may be utilized to selectively place the excavator 20 (FIG. 1) or another work vehicle in a travel mode in which one or more joystick devices can be utilized to pilot (steer and control the speed of) the work vehicle. In other instances in which the work vehicle includes EH actuation system, such as the EH actuation system 44 shown in FIG. 1, utilized to animate a boom assembly or otherwise move an implement attached to a work vehicle, the operator-selected control mode can be a hydraulic flow priority mode in which the EH actuation system 44 varies a routing scheme by which pressurized hydraulic fluid is delivered to hydraulic cylinders contained in the EH actuation system 44; a lift mode in which a pressure limit of the EH actuation system 44 is increased, while a maximum pump flow of the EH actuation system 44 is decreased; or a pressure boost mode in which a circuit pressure within the EH actuation system 44 is temporarily increased. In the latter instance, the MRF detent (or detents) enabling entry into the pressure boost mode may be selectively generated when, for example, the controller architecture 50 determines that the boom assembly 24 has encountered (or will soon encounter) a stall condition impeding movement of the bucket 26 in a particular direction.

Lastly, as indicated by the third work vehicle function category 214 in FIG. 5, various other detent-triggered work vehicle functions can be selectively activated by joystick movement relative to one or more MRF detents in embodiments of the present disclosure. This includes, for example, a customization mode in which operator movement of a joystick relative to the MRF detents may adjust the detent resistive force, selectively deactivate or suppress generation of the MRF detents, or otherwise adjust a parameter of the MRF detents to operator preference. Regardless of the particular detent-triggered work vehicle function or functions availed through the MRF joystick system 22, the controller architecture 50 may repeatedly the MRF detent control process 190 to selectively generate MRF detents and then activate detent-triggered work vehicle functions based, at least in part, upon joystick movements relative to such detents. Additional description of example detent-triggered work vehicle functions and manners in which such work vehicle functions may be triggered based, at least in part, on joystick movement relative to one or more MRF detents will now be provided in connection with FIG. 6.

Figure 6:
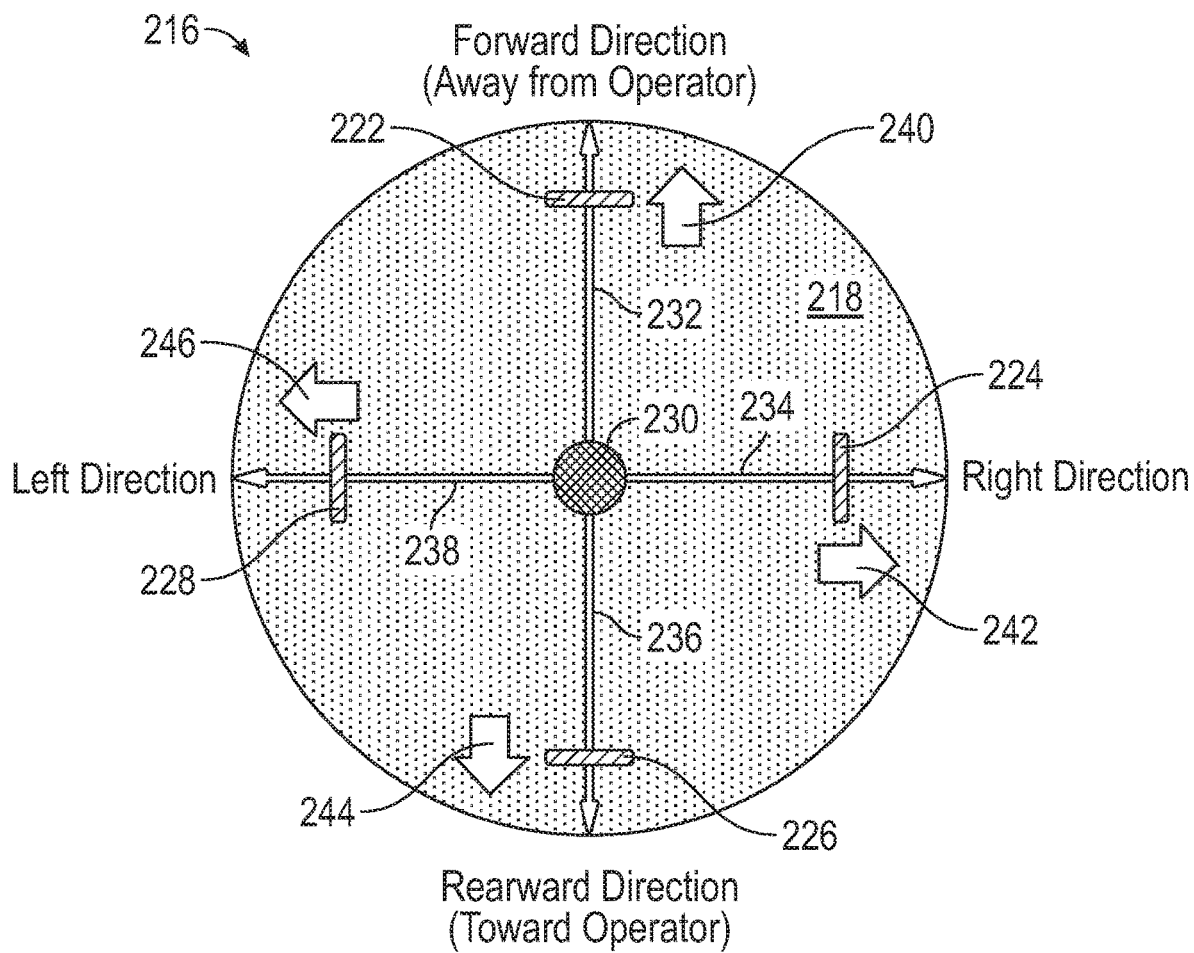
FIG. 6 is a schematic of an example joystick range of motion and illustrating possible locations of MRF detents utilized in triggering various work vehicle functions in embodiments of the present disclosure.

FIG. 6 is a schematic 216 illustrating a range of motion 218 of the example MRF joystick device (e.g., either of the joystick devices 52, 54 shown in FIG. 2) and MRF detent features into or through which an operator may rotate a joystick to activate certain features or actions of a work vehicle, such as the example excavator 20 shown in FIG. 1. The MRF joystick device can be located onboard any suitable work vehicle, including the various example work vehicles described below in connection with FIG. 7. As indicated by a key 220, four detent position markers 222, 224, 226, 228, identify predetermined locations at which an MRF detent effect may be generated by the MRF joystick system 22 (FIG. 1) as the joystick 230 is moved in a given direction 232, 234, 236, 238. The MRF detent positions 222, 224, 226, 228 are illustrated by way of example, noting that only single detent position, a subset of the detent positions, or detent positions having different locations over the joystick ROM can be generated in various embodiments of the MRF joystick system 22. Further, in implementation in which joystick rotation into or through a given detent position (when the joystick is rotated in a direction moving away from the centered or neutral position) activate or trigger a work vehicle function, the work vehicle function triggered by the detent will vary depending upon the work vehicle under consideration and, perhaps, may be customizable to operator preferences. In this latter regard, the MRF joystick system 22 may permit an operator to assign different work vehicle functions to the detent positions or otherwise vary aspects of the MRF detent; e.g., detent hold force, detent location, detent position, or detent activation.

In the case of work vehicle capable of track counter-rotation, such as certain excavators (e.g., the excavator 20 shown in FIG. 1), dozers, and other work vehicles, the MRF joystick device may enable the activation of a counter-rotation turn function by moving the joystick into or through an MRF detent, as described above in connection with the category 210 contain in STEP 206 of the example process 190 (FIG. 5). In an embodiment in which the excavator 20 is operable in a travel mode in which one or both of the above-described joysticks 52, 54 (FIG. 2) are utilized to steer or otherwise control the directional movement of the excavator 20, such a detent-triggered counter-rotate feature may be advantageously provided when the excavator 20 operates in travel mode. In this case, one joystick (e.g., the left joystick 52 shown in FIG. 2) may be utilized to steer the excavator when in travel mode. In this case, moving the joystick 52 from the center position in the left direction into or beyond the MRF detent position 228 (FIG. 6), may cause counter-rotation (rotation of the tracks in opposing directions) turning the excavator 20 in a leftward direction. Conversely, moving the joystick 52 from the center position in the right direction into or beyond the MRF detent position 224 (FIG. 6), may cause counter-rotation turning the excavator 20 to the right. In this manner, excavator counter-rotation can be conveniently achieved utilizing a single joystick as opposed to using foot pedals or another operator input device. Such an approach also equally applicable to other work vehicles, such as the below-described dozer 290 shown in FIG. 7, capable of turning by counter-rotation; e.g., again, MRF detents may be created at selected locations along the steering axis of an MRF joystick device and, when an operator moves the joystick into or through a given MRF detent in a particular operator input direction (e.g., in a left or right direction moving away from the joystick center position), a corresponding counter-rotation function may be performed. Such a counter-rotation function or maneuver may be implemented by the controller architecture 50 of the MRF joystick system 22 by sending appropriate commands to the valve actuators included in an EH actuation system, such as the EH actuation system 44 of the excavator 20 shown in FIG. 1.

As indicated above in connection with the category 210 of the MRF detent control process 190 (FIG. 5), other automated movement functions suitably triggered utilizing MRF detents include excavator jump turns (which again may be made available through detents selectively applied during excavator travel) and implement auto-positioning (kick-out) functions. For example, in the case of a work vehicle equipped with a boom assembly, such as the below-described loader 248 quipped with an FEL bucket 260, rotation of the joystick in a direction raising the implement (e.g., movement of the joystick in a rearward direction) through a particular MRF detent (e.g., such as the MRF detent 226 in FIG. 6) may trigger an implement auto-positioning or kick-out function automatically moving the implement (e.g., the FEL bucket 260) into a upper preset position. Conversely, rotation of the joystick in a direction lowering the implement (e.g., joystick movement in a forward direction) through a detent (e.g., such as the MRF detent 222 in FIG. 6) may trigger an implement auto-positioning function automatically lowering the implement (e.g., the FEL bucket 260) into a lower preset position. Any or all of such detent-triggered functions may be implemented by appropriate command signals transmitted from the controller architecture 50 to the pertinent actuators of the work vehicle.

A non-exhaustive list of still other work vehicle functions that may be triggered utilizing MRF detents includes pressure boost functions, travel speed boot functions, auto-shift functions, and lift mode functions, as further discussed above in connection with the detent-triggered work vehicle function category 212 (FIG. 5). In the case of pressure boost functions, when activated by moving the joystick into or beyond an MRF detent in a manner analogous to that just described, such a pressure boost function may be activated by the controller architecture 50 to temporarily increase hydraulic pressures. Specifically, the controller architecture 50 may transmit appropriate commands to one or more pumps included in an EH actuation system, such as the EH actuation system 44 of the excavator 20 shown in FIG. 1, to deliver additional power to machine when the pressure boost function is activated. In the case of travel speed boost functions, when activated via joystick motion into or through an MRF detent, such a function may temporarily increase engine speed or power output past that normally scheduled, perhaps to a wide-open throttle setting. With respect to the auto-shift function, an operator may move the joystick through an MRF detent position to transition into travel mode, potentially allowing a seal switch module button typically utilized for this purpose to be eliminated or utilized for another purpose. Lastly, with respect to lift mode, an operator may move a given joystick through an MRF detent to increase system pressure (within limits), which decreasing maximum pump flow of a pump contained in the EH actuation system 44. Again, the controller architecture 50 may implement each of these functions, when activated or triggered by joystick movement relative to one or MRF detents, by transmitting appropriate command signals to the actuators included in the EH actuation system 44.

In yet other embodiments, and as mentioned above in connection with the work vehicle function category 212 set-forth in STEP 206 of the process 190 (FIG. 5), detent-relative joystick movement may be utilized to alter the hydraulic flow control scheme of an EH actuation system, such as the EH actuation system 44 of the excavator 20 shown in FIG. 1. In this regard, joystick motion relative to (into or through) one or more MRF detent positions may be utilized in the place of pilot signals to switch between different hydraulic flow priority modes in embodiments, providing that the components (e.g., the main control valve) of the EH actuation system 44 possesses priority logic or the EH actuation system 44 is otherwise capable of prioritizing hydraulic flow in this manner. As mentioned above, three examples of such hydraulic flow priority schemes include boom priority, swing priority, and swing logic control modes. These hydraulic flow priority control modes are each discussed, in turn, below.

When activated via joystick motion into or through an MRF detent, the boom priority setting prioritizes hydraulic flow to the boom raise function over the arm function of the boom assembly of a work vehicle, such as the excavator 20 shown in FIG. 1. In this case, a corresponding MRF detent may be generated by the controller architecture 50 (through appropriate commands to the MRF joystick resistance mechanism 56) such that the detent is encountered in the boom raise direction of an MRF joystick device. Referring to the MRF joystick devices 52, 54 shown in FIG. 2 and beginning from the joystick center position, such an MRF detent (for activating the boom priority setting) may be countered by pulling the right joystick (ISO Pattern) or left joystick (SAE pattern) rearward (along the negative Y-axis as viewed from the standpoint of an operator). When activated, the controller architecture 50 may then transmit appropriate control commands to an actuator (e.g., a solenoid) included in the EH actuation system 44 to move the boom priority spool and actuate this feature when desired. Similarly, when activated utilizing the MRF joystick system 22, the swing priority setting may prioritize hydraulic flow for boom swing over the arm function. In embodiments, the operator may encounter the detent for this feature in either the swing left or swing right direction; here, moving a joystick (e.g., the joystick of the left joystick device 52 shown in FIG. 2) in either left or right from the perspective of the operator. As with the boom priority feature above, this feature may be controlled electro-hydraulically utilizing, for example, a solenoid incorporated into the EH actuation system 44. Finally, the MRF joystick system 22 may generate an MRF detent for activating a swing logic setting of the excavator 20 (or a comparable work vehicle) in embodiments. When provided and activated by an operator through appropriate joystick movements, functions may be performed to provide a controlled restriction of flow to the swing function; e.g., through shifting of a valve element (e.g., spool) via a solenoid further included in the EH actuation system 44. This may prioritize boom movements over the swing feature, with the swing feature otherwise receiving a greater priority in hydraulic flow when the swing logic is off.

Through the generation of such MRF detents enabling the selective activation of work vehicle functions, embodiments of the MRF joystick system 22 increase joystick control capabilities to allow operators to selectively execute various work vehicle functions, while maintaining physical contact with the joystick device or devices. Operator convenience and overall work vehicle efficiency may be improved as a result. Further, various aspects of the MRF joystick system 22 may be customizable to operator preference in embodiments. For example, in embodiments, a work vehicle operator may interact with the operator interface 78 to adjust the degree or level of resistive force encountered when moving through any of the MRF detents; to adjust the positioning of the detent features as encountered along the joystick range of travel in any given direction; and/or to selectively turn-off (deactivate) the detents features as desired. Similarly, an operator may interact with the operator interface 78 to activate other detents along other rotational axes and, perhaps, to assign different work vehicle functions to such detent features. When an operator adjusts aspects of the detent features to preference, the operator preference settings may be stored in the memory 68 as part of the personalization settings data, which may be recalled and implemented when identifying a registered operator of the excavator 20; e.g., based on a pin or other information entered via the operator interface 78 uniquely identifying the registered operator when logging in to the loader operating system. So too may the controller architecture 50 automatically adjust such detent-related parameters or selectively active the detents in relation to any parameter monitored by the sensors of the excavator 20 or a particular operative mode of the excavator 20.

Figure 7:
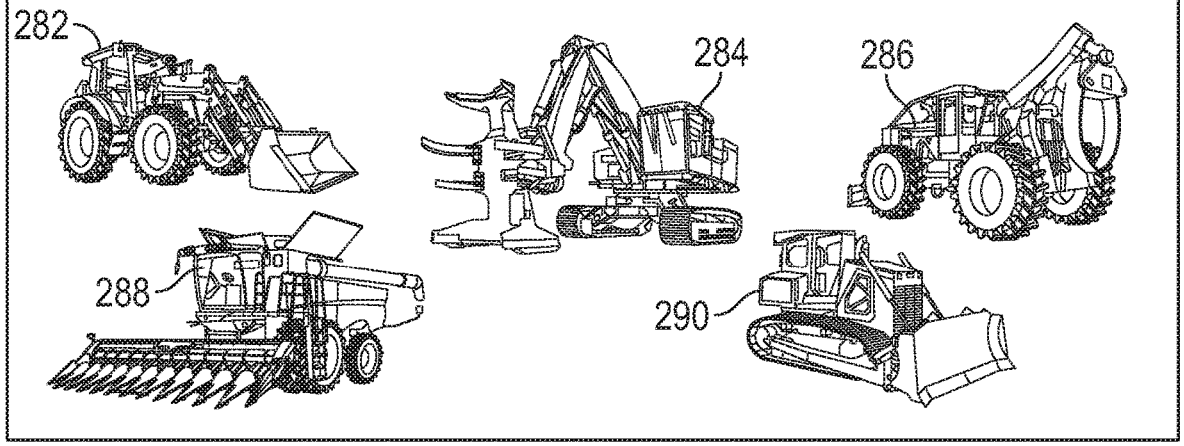
FIG. 7 is a graphic illustrating, in a non-exhaustive manner, additional example work vehicles into which embodiments of the MRF joystick system may be beneficially integrated.

Additional Examples of Work Vehicles Beneficially Equipped With MRF Joystick Systems Turning now to FIG. 7, additional examples of work vehicles into which embodiments of the MRF joystick system may be beneficially incorporated are illustrated. Specifically, and referring initially to the upper portion of this drawing figure, three such work vehicles are shown: a wheel loader 248, an SSL 250, and a motor grader 252. Addressing first the wheel loader 248, the wheel loader 248 may be equipped with an example MRF joystick device 254 located within the cabin 256 of the wheel loader 248. When provided, the MRF joystick device 254 may be utilized to control the movement of a FEL 258 terminating in a bucket 260; the FEL 258, and front end loaders generally, considered a type of "boom assembly" in the context of this document. Comparatively, two MRF joystick devices 262 may be located in the cabin 264 of the example SSL 250 and utilized to control not only the movement of the FEL 266 and its bucket 268, but further control movement of the chassis 270 of the SSL 250 in the well-known manner. Finally, the motor grader 252 likewise includes two MRF joystick devices 272 located within the cabin 274 of the motor grader 252. The MRF joystick devices 272 can be utilized to control the movement of the motor grader chassis 276 (through controlling a first transmission driving the motor grader rear wheels and perhaps a second (e.g., hydrostatic) transmission driving the forward wheels), as well as movement of the blade 278 of the motor grader; e.g., through rotation of and angular adjustments to the blade-circle assembly 280, as well as adjustments to the side shift angle of the blade 278.

In each of the above-mentioned examples, the MRF joystick devices can be controlled to selectively generate MRF detents and execute work vehicle functions in response to joystick movement relative to such detents, when generated. In this regard, any or all of the example wheel loader 248, the SSL 250, and the motor grader 252 can be equipped with a work vehicle MRF joystick system including at least one joystick device, an MRF joystick resistance mechanism, and a controller architecture. Finally, still further examples of work vehicles usefully equipped with embodiments of the MRF joystick systems described herein are illustrated in a bottom portion of FIG. 7 and include an FEL-equipped tractor 282, a feller-buncher 284, a skidder 286, a combine 288, and a dozer 290. In each case, the MRF joystick system can selectively execute detent-triggered work vehicle functions appropriate for each work vehicle.

Enumerated Examples of the Work Vehicle MRF Joystick System

The following examples of the work vehicle MRF joystick system are further provided and numbered for ease of reference.

1. In embodiments, the work vehicle magnetorheological fluid (MRF) joystick system includes a joystick device having a base housing, a joystick movably mounted to the base housing, and a joystick position sensor configured to monitor movement of the joystick relative to the base housing. An MRF joystick resistance mechanism is controllable to vary a joystick stiffness resisting movement of the joystick relative to the base housing in at least one degree of freedom. A controller architecture is coupled to the joystick position sensor and to the MRF joystick resistance mechanism. The controller architecture is configured to: (i) command the MRF joystick resistance mechanism to increase the joystick stiffness when the joystick is moved into a first predetermined detent position to generate a first MRF detent; and (ii) selectively activate a first detent-triggered function of the work vehicle based, at least in part, on joystick movement relative to the first MRF detent.

2. The work vehicle MRF joystick system of example 1, wherein the first detent-triggered function includes an automated movement routine of the work vehicle.

3. The work vehicle MRF joystick system of example 2, wherein the work vehicle assumes the form of an excavator, and wherein the automated movement routine is a jump turn sequence.

4. The work vehicle MRF joystick system of example 3, wherein the excavator is operable in a travel mode in which the joystick device is utilized to steer the excavator. The controller architecture is configured to command the MRF resistance mechanism to generate the first MRF detent when the excavator operates in the travel mode.

5. The work vehicle MRF joystick system of example 2, wherein the work vehicle includes a tracked undercarriage, while the automated movement routine involves counter-rotation of the tracked undercarriage.

6. The work vehicle MRF joystick system of example 2, wherein the work vehicle includes a boom assembly having a terminal end to which an implement is attached. The automated movement routine involves automated movement of the boom assembly to bring raise or lower the implement into a preset position.

7. The work vehicle MRF joystick system of example 1, wherein the first detent-triggered function of the work vehicle involves entry of the work vehicle into an operator-selected control mode.

8. The work vehicle MRF joystick system of example 7, wherein the operator-selected control mode is a travel mode in which the joystick device can be utilized to steer the work vehicle.

9. The work vehicle MRF joystick system of example 7, wherein the work vehicle includes an electrohydraulic (EH) actuation system, while the operator-selected control mode is a pressure boost mode in which a circuit pressure within the EH actuation system is temporarily increased.

10. The work vehicle MRF joystick system of example 9, wherein the work vehicle includes a boom assembly terminating in an implement and moved utilizing the EH actuation system. The controller architecture is configured to: (i) detect when the boom assembly encounters a stall condition; and (ii) generate the first MRF detent enabling activation of the pressure boost mode in response to detection of a stall condition.

11. The work vehicle MRF joystick system of example 9, wherein the operator-selected control mode includes a hydraulic flow priority mode in which the EH actuation system varies a routing scheme by which pressurized hydraulic fluid is delivered to hydraulic cylinders contained in the EH actuation system.

12. The work vehicle MRF joystick system of example 9, wherein the operator-selected control mode includes a lift mode in which the controller architecture increases a pressure limit of the EH actuation system, while decreasing a maximum pump flow thereof.

13. The work vehicle MRF joystick system of example 1, wherein the work vehicle includes a work vehicle engine, while the operator-selected control mode is a travel speed boost mode in which the controller architecture temporarily increases a power output of the work vehicle engine.

14. The work vehicle MRF joystick system of example 1, wherein the first detent-triggered function is activated by movement of the joystick beyond the first predetermined detent position in a direction opposite a neutral position of the joystick. The controller architecture is further configured to vary a speed at which the first detent-triggered function is performed based on a displacement of the joystick beyond the first predetermined detent position.

15. The work vehicle MRF joystick system of example 1, further including an operator interface coupled to the controller architecture, while the controller architecture is configured to enable an operator to select the first detent-triggered function from a plurality of work vehicle functions utilizing the operator interface.

CONCLUSION

The foregoing has thus provided work vehicle MRF joystick systems configured to generate MRF detents, which can be utilized to trigger various work vehicle functions. Examples of various detent-triggered work vehicle functions that may be implemented utilizing embodiments of the MRF joystick system include automated turning of joystick-steered work vehicles, such as through counter-rotation functions (in the case of tracked work vehicles capable of turning by counter-rotation) and jump turn functions (in the case of excavators). Various modified EH control schemes can also be activated utilizing MRF detents in embodiments, such as pressure boost and lift mode functions. Through the generation of such MRF detents enabling the selective activation of work vehicle functions, embodiments of the MRF joystick system increase joystick control capabilities to allow operators to selectively execute various work vehicle functions, while maintaining physical contact with the joystick device or devices. Operator convenience and overall work vehicle efficiency may be improved as a result. Further, various aspects of the MRF joystick system may be customizable to operator preference in embodiments; and, in at least some instances, an operator may interact with the MRF joystick system to program the MRF detents by selecting the particular work vehicle functions triggered by joystick movement relative to the MRF detents.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle, the work vehicle MRF joystick system comprising:
   a joystick device, comprising:
      a base housing;
      a joystick movably mounted to the base housing; and
      a joystick position sensor configured to monitor movement of the joystick relative to the base housing;
   an MRF joystick resistance mechanism controllable to vary a joystick stiffness resisting movement of the joystick relative to the base housing in at least one degree of freedom; and
   a controller architecture coupled to the joystick position sensor and to the MRF joystick resistance mechanism, the controller architecture configured to:
      command the MRF joystick resistance mechanism to increase the joystick stiffness when the joystick is moved into a first predetermined detent position to generate a first MRF detent; and
      selectively activate a first detent-triggered function of the work vehicle based, at least in part, on joystick movement relative to the first MRF detent.

2. The work vehicle MRF joystick system of claim 1, wherein the first detent-triggered function comprises an automated movement routine of the work vehicle.

3. The work vehicle MRF joystick system of claim 2, wherein the work vehicle comprises an excavator; and
   wherein the automated movement routine comprises a jump turn sequence.

4. The work vehicle MRF joystick system of claim 3, wherein the excavator is operable in a travel mode in which the joystick device is utilized to steer the excavator; and
   wherein the controller architecture is configured to command the MRF resistance mechanism to generate the first MRF detent when the excavator operates in the travel mode.

5. The work vehicle MRF joystick system of claim 2, wherein the work vehicle comprises a tracked undercarriage; and
   wherein the automated movement routine comprises counter-rotation of the tracked undercarriage.

6. The work vehicle MRF joystick system of claim 2, wherein the work vehicle includes a boom assembly having a terminal end to which an implement is attached; and
wherein the automated movement routine comprises automated movement of the boom assembly to bring raise or lower the implement into a preset position.

7. The work vehicle MRF joystick system of claim 1, wherein the first detent-triggered function of the work vehicle comprises entry of the work vehicle into an operator-selected control mode.

8. The work vehicle MRF joystick system of claim 7, wherein the operator-selected control mode comprises a travel mode in which the joystick device can be utilized to steer the work vehicle.

9. The work vehicle MRF joystick system of claim 7, wherein the work vehicle comprises an electrohydraulic (EH) actuation system; and
wherein the operator-selected control mode comprises a pressure boost mode in which a circuit pressure within the EH actuation system is temporarily increased.

10. The work vehicle MRF joystick system of claim 9, wherein the work vehicle includes a boom assembly terminating in an implement and moved utilizing the EH actuation system; and
wherein the controller architecture is configured to:
detect when the boom assembly encounters a stall condition; and
generate the first MRF detent enabling activation of the pressure boost mode in response to detection of a stall condition.

11. The work vehicle MRF joystick system of claim 9, wherein the operator-selected control mode comprises a hydraulic flow priority mode in which the EH actuation system varies a routing scheme by which pressurized hydraulic fluid is delivered to hydraulic cylinders contained in the EH actuation system.

12. The work vehicle MRF joystick system of claim 9, wherein the operator-selected control mode comprises a lift mode in which the controller architecture increases a pressure limit of the EH actuation system, while decreasing a maximum pump flow thereof.

13. The work vehicle MRF joystick system of claim 7, wherein the work vehicle comprises a work vehicle engine; and
wherein the operator-selected control mode comprises a travel speed boost mode in which the controller architecture temporarily increases a power output of the work vehicle engine.

14. The work vehicle MRF joystick system of claim 1, wherein the first detent-triggered function is activated by movement of the joystick beyond the first predetermined detent position in a direction opposite a neutral position of the joystick; and
wherein the controller architecture is further configured to vary a speed at which the first detent-triggered function is performed based on a displacement of the joystick beyond the first predetermined detent position.

15. The work vehicle MRF joystick system of claim 1, further comprising an operator interface coupled to the controller architecture; and
wherein the controller architecture is configured to enable an operator to select the first detent-triggered function from a plurality of work vehicle functions utilizing the operator interface.

16. The work vehicle MRF joystick system of claim 1, further comprising an operator interface coupled to the controller architecture; and
wherein the controller architecture is configured to enable an operator to adjust a location of the first predetermined detent position within a range of motion of the joystick, a stiffness intensity setting for the first MRF detent, or both.

17. The work vehicle MRF joystick system of claim 1, wherein the joystick is rotatable relative to the base housing about an axis and is biased toward a neutral position;
wherein the first predetermined detent position is encountered when rotating the joystick from the neutral position about the axis in a first rotational direction; and
wherein the controller architecture is further configured to:
command the MRF joystick resistance mechanism to increase the MRF resistance force when the joystick is moved into a second predetermined detent position to generate a second MRF detent encountered when rotating the joystick from the neutral position about the axis in a second rotational direction opposite the first rotational direction; and
selectively activate a second detent-triggered function of the work vehicle based, at least in part, on joystick movement following generation of the second MRF detent.

18. The work vehicle MRF joystick system of claim 17, wherein the first detent-triggered function of the work vehicle comprises movement of the work vehicle or a portion of the work vehicle in a first direction; and
wherein the second detent-triggered function of the work vehicle comprises movement of the work vehicle or the portion of the work vehicle in a second direction opposite the first direction.

19. A work vehicle magnetorheological fluid (MRF) joystick system for usage onboard a work vehicle, the work vehicle MRF joystick system comprising:
a joystick device, comprising:
a base housing;
a joystick movably mounted to the base housing; and
a joystick position sensor configured to monitor movement of the joystick relative to the base housing;
an MRF joystick resistance mechanism controllable to vary a joystick stiffness resisting movement of the joystick relative to the base housing in at least one degree of freedom; and
a controller architecture coupled to the joystick position sensor and to the MRF joystick resistance mechanism, the controller architecture configured to:
command the MRF joystick resistance mechanism to increase the joystick stiffness when the joystick is moved into a first predetermined detent position to generate a first MRF detent; and
selectively activate an automated movement routine of the work vehicle based, at least in part, on joystick movement relative to the first MRF detent.

20. A work vehicle magnetorheological fluid (MRF) joystick system for usage onboard a work vehicle, the work vehicle MRF joystick system comprising:
a joystick device, comprising:
a base housing;
a joystick movably mounted to the base housing; and
a joystick position sensor configured to monitor movement of the joystick relative to the base housing;
an MRF joystick resistance mechanism controllable to vary a joystick stiffness resisting movement of the joystick relative to the base housing in at least one degree of freedom; and a controller architecture coupled to the joystick position sensor and to the MRF joystick resistance mechanism, the controller architecture configured to:
 command the MRF joystick resistance mechanism to increase the joystick stiffness when the joystick is moved into a first predetermined detent position to generate a first MRF detent; and
 selectively place the work vehicle in an operator-selected control mode based on joystick movement relative to the first MRF detent.

* * * * *